US010298322B2

United States Patent
Wang et al.

(10) Patent No.: US 10,298,322 B2
(45) Date of Patent: *May 21, 2019

(54) METHODS AND APPARATUS FOR DETECTING AND COMPENSATING POWER IMBALANCE AND MODULATION IMPERFECTION FOR A COHERENT OPTICAL TRANSMITTER

(71) Applicant: Juniper Networks, Inc., Sunnyvale, CA (US)

(72) Inventors: Qiang Wang, San Carlos, CA (US); Yang Yue, Milpitas, CA (US); Xuan He, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,326

(22) Filed: Apr. 27, 2018

(65) Prior Publication Data

US 2018/0248620 A1 Aug. 30, 2018

Related U.S. Application Data

(63) Continuation of application No. 15/394,280, filed on Dec. 29, 2016, now Pat. No. 9,979,472.

(51) Int. Cl.
*H04B 10/08* (2006.01)
*H04B 10/079* (2013.01)
(Continued)

(52) U.S. Cl.
CPC ... *H04B 10/07955* (2013.01); *H04B 10/5161* (2013.01); *H04B 10/532* (2013.01); *H04B 10/541* (2013.01); *H04B 10/564* (2013.01)

(58) Field of Classification Search
CPC .......... H04B 10/07955; H04B 10/5161; H04B 10/532; H04B 10/564
(Continued)

(56) References Cited

U.S. PATENT DOCUMENTS 9,124,364 B1   9/2015 Sotoodeh et al.
9,407,361 B1 * 8/2016 Zhang .............. H04B 10/07955
(Continued)

FOREIGN PATENT DOCUMENTS

EP         2107418 A1   10/2009

OTHER PUBLICATIONS

Faruk, S. et al., "Compensation for In-Phase/Quadrature Imbalance in Coherent-Receiver Front End for Optical Quadrature Amplitude Modulation," IEEE Photonics Journal, vol. 5, No. 2, Apr. 2013, 10 pages.
(Continued)

*Primary Examiner* — Mohammad R Sedighian
(74) *Attorney, Agent, or Firm* — Cooley LLP

(57) ABSTRACT

In some embodiments, a non-transitory processor-readable medium storing code representing instructions to be executed by a processor comprises code to cause the processor to determine, during a calibration of a coherent optical transmitter, a set of parameters associated with each tributary channel by sending a first signal to a digital signal processor (DSP) to adjust a scale factor of that tributary channel. The scale factor is associated with a tap characteristic of a finite impulse response (FIR) filter of the DSP. The code further causes the processor to determine a power imbalance between two tributary channels based on the set of parameters associated with each tributary channel. The code further causes the processor to send a second signal to the coherent optical transmitter to adjust a set of operational settings of the coherent optical transmitter based on the
(Continued)

power imbalance and the set of parameters associated with each tributary channel.

20 Claims, 10 Drawing Sheets

(51) Int. Cl.
*H04B 10/564* (2013.01)
*H04B 10/516* (2013.01)
*H04B 10/532* (2013.01)
*H04B 10/54* (2013.01)

(58) Field of Classification Search
USPC .......................................................... 398/38
See application file for complete search history.

(56) References Cited

U.S. PATENT DOCUMENTS

| | | | | |
|---|---|---|---|---|
| 9,654,226 | B1* | 5/2017 | Bhandare | H04B 10/58 |
| 9,729,244 | B2* | 8/2017 | Alfiad | H04B 10/50572 |
| 9,749,057 | B2* | 8/2017 | Yue | H04B 10/532 |
| 9,825,699 | B2* | 11/2017 | Zhao | H04B 10/07955 |
| 9,979,472 | B1* | 5/2018 | Wang | H04B 10/07955 |
| 2004/0032913 | A1 | 2/2004 | Dinur | |
| 2010/0080570 | A1 | 4/2010 | Conroy et al. | |
| 2013/0223849 | A1 | 8/2013 | Whiteaway et al. | |

OTHER PUBLICATIONS

Sotoodeh, M. et al., "Modulator Bias and Optical Power Control of Optical Complex E-Field Modulators," Journal of Lightwave Technology, vol. 29, No. 15, Aug. 1, 2011, pp. 2235-2248.

Optical Internetworking Forum, "Implementation Agreement for CFP2-Analogue Coherent Optics Module," IA # OIF-CFP2-ACO-01.0, Jan. 22, 2016, 92 pages, [Online], <URL: http://www.oiforum.com/wp-content/uploads/OIF-CFP2-ACO-01.0.pdf>.

Extended European Search Report for European Patent Application No. 17164024.6, dated Nov. 9, 2017, 10 pages.

* cited by examiner

900

902 | Determine, during a calibration of a coherent optical transmitter, a set of parameters associated with each tributary channel from a set of tributary channels.

904 | Determine, during the calibration of the coherent optical transmitter, a power imbalance between the first tributary channel and the second tributary channel based on the set of parameters associated with the first tributary channel and the set of parameters associated with the second tributary channel.

906 | Send a signal to the coherent optical transmitter to adjust a set of operational settings of the coherent optical transmitter, such that the power imbalance between the first tributary channel and the second tributary channel is reduced.

1002 — Send, to an optical transmitter and during an operational phase of the optical transmitter, a first signal to adjust a scale factor of each tributary channel from a set of tributary channels of an optical modulator within a predetermined range 1004 — Determine, in response to the scale factor of the first tributary channel and the scale factor of the second tributary channel being adjusted and during the operational phase of the optical transmitter, a power imbalance between the first tributary channel and the second tributary channel 1006 — Send, to the optical transmitter, a second signal to adjust a set of operational settings of the optical transmitter based on the power imbalance between the first tributary channel and the second tributary channel such that the power imbalance between the first tributary channel and the second tributary channel is reduced.

FIG. 10

METHODS AND APPARATUS FOR DETECTING AND COMPENSATING POWER IMBALANCE AND MODULATION IMPERFECTION FOR A COHERENT OPTICAL TRANSMITTER

CROSS-REFERENCE TO RELATED APPLICATION

This application is a continuation of U.S. patent application Ser. No. 15/394,280, now U.S. Pat. No. 9,979,472, filed on Dec. 29, 2016, and entitled "Methods And Apparatus For Detecting And Compensating Power Imbalance And Modulation Imperfection For A Coherent Optical Transmitter," the disclosure of which is incorporated herein by reference in its entirety.

BACKGROUND

Some embodiments described herein relate generally to methods and apparatus for optical modulation. In particular, but not by way of limitation, some embodiments described herein relate to methods and apparatus for detecting and compensating power imbalance and modulation imperfection for coherent optical transmitter.

With a growing demand of optical communication systems with high data rates capability, optical quadrature amplitude modulation (QAM) signals are generated to provide high data-carrying capacity and high spectral efficiency. Quadrature amplitude modulation (QAM) is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy. Polarization modulation (PM) is a modulation technique where two independent electrical data signals are modulated onto an optical carrier wave having orthogonal polarizations (e.g., an X channel polarization and a Y channel polarization) so that the overall data throughput is doubled without doubling the spectral bandwidth.

A typical dual-polarization QAM (DP-QAM) transmitter includes four tributary channels, XI, XQ, YI, and YQ, which are used for in-phase and quadrature modulation for both a X channel polarization and a Y channel polarization. These four tributary channels are not identical, which leads to imbalanced power between XI and XQ tributary channels, YI and YQ tributary channels, and XY channels. Large uncompensated power imbalances can degrade the system performance in a coherent optical communication system.

Known solutions to compensate the power imbalances either use additional external electrical circuits or are implemented during an initial power-up phase of an optical transmitter, not when the optical transmitter is operating with live data traffic. Accordingly, a need exists for improved and simplified methods and apparatus to detect and compensate power imbalance in a coherent optical transmitter.

SUMMARY

In some embodiments, a non-transitory processor-readable medium storing code representing instructions to be executed by a processor comprises code to cause the processor to determine, during a calibration of a coherent optical transmitter, a set of parameters associated with each tributary channel from a set of tributary channels by sending a first signal to a digital signal processor (DSP) to adjust a scale factor of that tributary channel from the set of tributary channels. The coherent optical transmitter has an optical modulator and the DSP operatively coupled to the optical modulator. The coherent optical transmitter configured to output an optical signal processed by the DSP and modulated by the optical modulator via the set of tributary channels. The set of tributary channels includes a first tributary channel and a second tributary channel. The scale factor is associated with a tap characteristic of a transmission filter of the DSP. The non-transitory processor-readable medium further comprises code to cause the processor to determine, during the calibration of the coherent optical transmitter, a power imbalance between the first tributary channel and the second tributary channel based on the set of parameters associated with the first tributary channel and the set of parameters associated with the second tributary channel. The non-transitory processor-readable medium further comprises code to cause the processor to send a second signal to the coherent optical transmitter to adjust a set of operational settings of the coherent optical transmitter based on (1) the power imbalance between the first tributary channel and the second tributary channel and (2) the set of parameters associated with the first tributary channel or the set of parameters associated with the second tributary channel, such that the power imbalance between the first tributary channel and the second tributary channel is reduced.

BRIEF DESCRIPTION OF THE DRAWINGS

FIG. 9 is a flow chart illustrating a method 900 to compensate power imbalances of an optical transmitter during a calibration phase of the optical transmitter, according to an embodiment.

FIG. 10 is a flow chart illustrating a method 1000 to compensate power imbalances of an optical transmitter during a signal transmission (or operational) phase of the optical transmitter, according to an embodiment.

DETAILED DESCRIPTION

Figure 1:
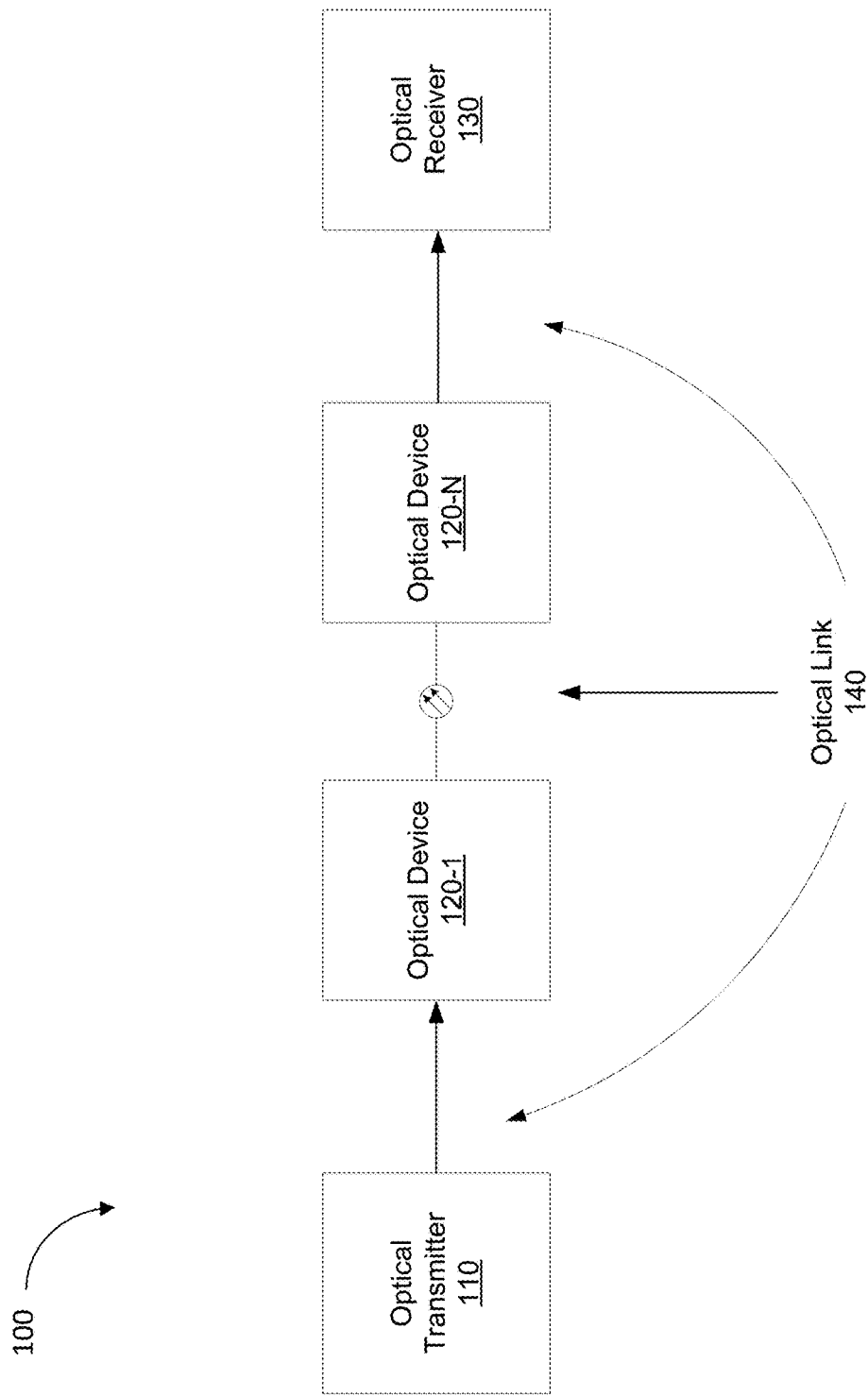
FIG. 1 is a block diagram illustrating an optical communication system, according to an embodiment.

A dual-polarization quadrature-amplitude-modulation (DP-QAM) transmitter includes four tributary channels, XI, XQ, YI, and YQ, which are used for in-phase and quadrature modulation of both x- and y-polarizations of an optical signal. In most circumstances, these four tributary channels are not identical, which leads to power imbalances between the XI tributary channel and the XQ tributary channel, between the YI tributary channel and the YQ tributary channel, and between the X tributary channel and the Q tributary channel for the DP-QAM transmitter. In addition, the bias point and the peak-peak phase shift of a Mach-Zehnder Modulator ("Modulator" or "MZM) within the DP-QAN transmitter are not identical as well. The imperfection in the bias point and the peak-peak phase shift may lead to not only power imbalances, but also distortion in constellation diagram Large uncompensated power imbalance can significantly degrade the system performance in a coherent optical communications system. The power imbalances can limit the distance of the transmission of the optical signal and the optical receiver may not be able to sufficiently compensate the power imbalance. Known solutions include installing a power meter at each tributary channel to monitor the optical power and attempt to compensate when power imbalances are detected. The power imbalances, however, can arise from an imperfection in a modulator bias and swing, which is difficult to be monitored by the power meter. Known solutions also include applying a dithering signal to the bias of the modulator and the strength of second order harmonics of the dithering signal can be used to determine power imbalances. This method, however, involves an external circuit to apply and detect the dithering. Another known solution includes loading a training binary phase-shift keying (BPSK) data during an initial power-up of the optical transmitter. By adjusting a phase difference between two tributary channels, a destructive interference can be achieved. The power level of the destructive interference can be used to determine the power imbalance between tributary channels. This method, however, cannot be used during a signal transmission phase (e.g., with live traffic) of the optical transmitter.

Some embodiments described herein include detecting and compensating the power imbalances for a DP-QAM optical transmitter at the transmitter end and during a signal transmission phase (e.g., with live traffic). Some embodiments include monitoring the bias point and the voltage swing during a calibration phase of the optical transmitter (e.g., an initial power-up phase). The imperfections in the bias point and the voltage swing can be compensated during the calibration phase. Furthermore, the power imbalances can be monitored and compensated during the signal transmission phase with live traffic. Embodiments described herein include compensating the power imbalance for a coherent optical transmitter without additional hardware, during a calibration phase or a signal transmission phase.

In some embodiments, a non-transitory processor-readable medium storing code representing instructions to be executed by a processor comprises code to cause the processor to determine, during a calibration of a coherent optical transmitter, a set of parameters associated with each tributary channel from a set of tributary channels by sending a first signal to a digital signal processor (DSP) to adjust a scale factor of that tributary channel from the set of tributary channels. The coherent optical transmitter has an optical modulator and the DSP operatively coupled to the optical modulator. The coherent optical transmitter configured to output an optical signal processed by the DSP and modulated by the optical modulator via the set of tributary channels. The set of tributary channels includes a first tributary channel and a second tributary channel. The scale factor is associated with a tap characteristic of a finite impulse response (FIR) filter of the DSP. The non-transitory processor-readable medium further comprises code to cause the processor to determine, during the calibration of the coherent optical transmitter, a power imbalance between the first tributary channel and the second tributary channel based on the set of parameters associated with the first tributary channel and the set of parameters associated with the second tributary channel. The non-transitory processor-readable medium further comprises code to cause the processor to send a second signal to the coherent optical transmitter to adjust a set of operational settings of the coherent optical transmitter based on (1) the power imbalance between the first tributary channel and the second tributary channel and (2) the set of parameters associated with the first tributary channel or the set of parameters associated with the second tributary channel, such that the power imbalance between the first tributary channel and the second tributary channel is reduced.

In some embodiments, a method includes sending, to an optical transmitter and during an operational phase of the optical transmitter, a first signal to adjust a scale factor of each tributary channel from a set of tributary channels of an optical modulator within a predetermined range. The optical transmitter includes the optical modulator and a finite impulse response (FIR) filter operatively coupled to the optical modulator. The scale factor of each tributary channel from the set of tributary channels is associated with a tap characteristic of the FIR filter. The set of tributary channels includes a first tributary channel and a second tributary channel. The method further includes determining, in response to the scale factor of the first tributary channel and the scale factor of the second tributary channel being adjusted and during the operational phase of the optical transmitter, a power imbalance between the first tributary channel and the second tributary channel. The method further includes sending, to the optical transmitter, a second signal to adjust a set of operational settings of the optical transmitter based on the power imbalance between the first tributary channel and the second tributary channel such that the power imbalance between the first tributary channel and the second tributary channel is reduced.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "a scale factor" is intended to mean a single scale factor or multiple scale factors.

FIG. 1 is a block diagram illustrating an optical communication system, according to an embodiment. The optical communication system 100 can be configured to produce, transmit, and/or receive optical signals. For example, the optical communication system 100 can be a wavelength division multiplexing (WDM) system, including a dense wavelength division multiplexing (DWDM) system. The optical communication system 100 can include an optical transmitter 110, one or more optical devices 120-1 through 120-N (N≥1) (hereinafter referred to individually as "optical device 120," and collectively as "optical devices 120"), an optical receiver 130, and an optical link 140.

Optical transmitter 110 can be operatively coupled to an optical device 120 and configured to produce and/or transmit an optical signal. For example, optical transmitter 110 may include a laser diode, a semiconductor laser, a continuous wave laser, and/or an optical modulator that may receive an electrical signal, and modulate, based on the electrical signal, an optical signal for transmission over optical link 140. Additionally, optical transmitter 110 can include a device capable of modulating an optical signal, such as an optical modulator, an electrical modulator, or the like. In some implementations, optical transmitter 110 can include a device capable of controlling properties associated with an optical signal and/or a modulator. In some implementations, optical transmitter 110 can include an optical receiver, such as a photodetector, associated with performing a measurement on an optical signal to control properties associated with the optical signal and/or a modulator. In some implementations, optical transmitter 110 can generate an optical signal that is associated with a particular type of waveform, such as a rectangular waveform, a sinusoidal waveform, or the like.

Optical transmitter 110 can be any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, and/or the like. In coherent optical communication systems with a coherent optical transceiver, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM). Details of optical transmitter 110 are discussed herein with regards to FIG. 2 and FIG. 8.

Optical device 120 can include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, and/or another type of device capable of processing and/or transferring optical traffic. Optical device 120 can process an optical signal and/or transmit an optical signal to another optical device 120 (and/or to optical receiver 130) via optical link 140 or a portion of optical link 140.

Optical receiver 130 can be operatively coupled to an optical device 120 and can receive an optical signal. For example, optical receiver 130 can include a photodetector and/or a photodiode that can detect an optical signal received via optical link 140, and can convert the optical signal into an electrical signal. In some implementations, optical receiver 130 can include a device capable of de-modulating an optical signal. In some implementations, optical receiver 130 can include a device capable of controlling properties associated with an optical signal and/or a de-modulator.

Optical link 140 can include a medium capable of carrying optical signals. For example, optical link 140 can include an optical fiber that interconnects optical transmitter 110, optical devices 120, and optical receiver 130. The optical link 140 can be included within an optical network that includes other optical links and optical devices.

The number and arrangement of devices shown in FIG. 1 are provided as an example. In some embodiments, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices.

Figure 2:
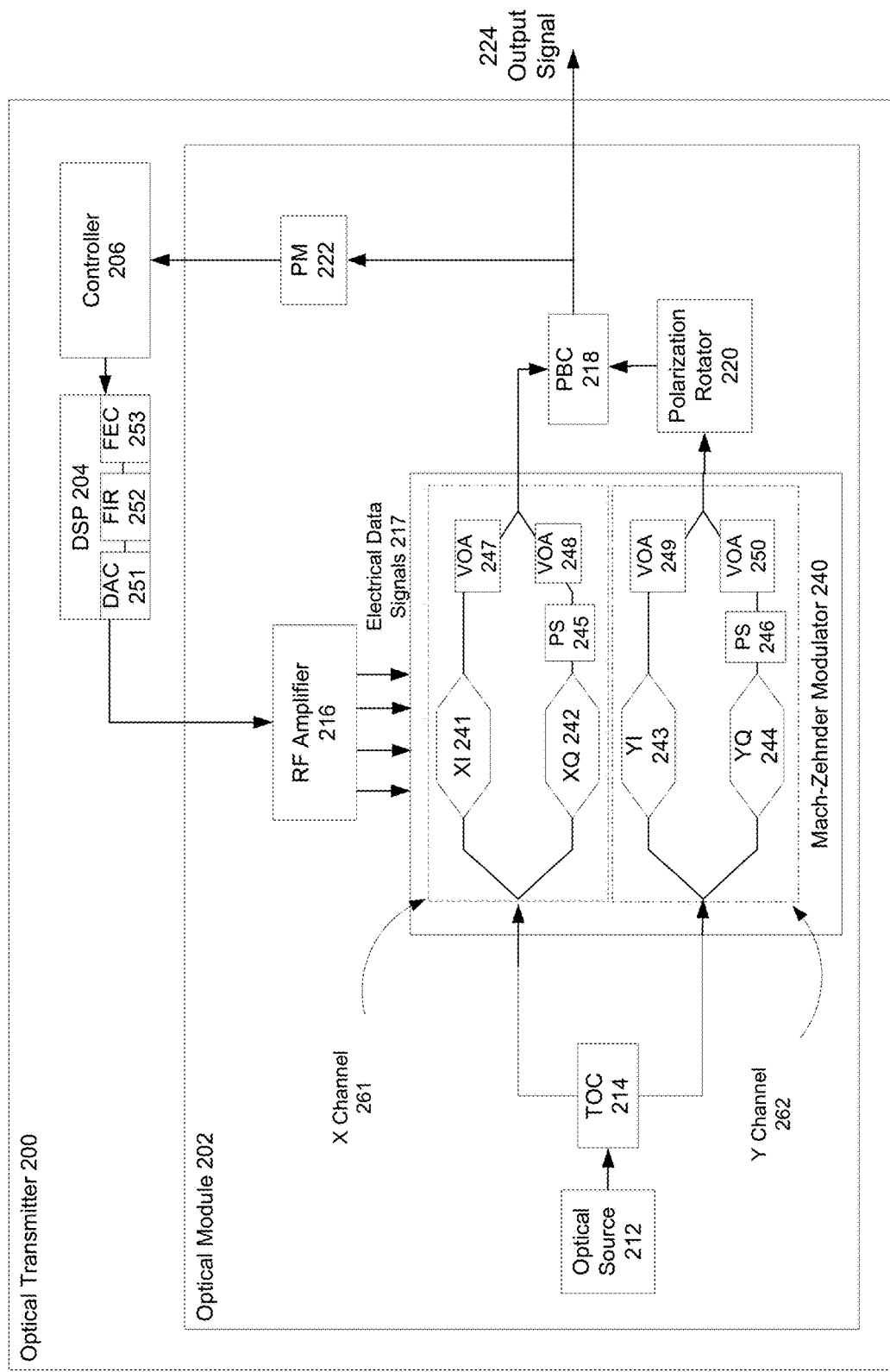
FIG. 2 is a block diagram illustrating an optical transmitter, according to an embodiment.

FIG. 2 is a block diagram illustrating an optical transmitter 200, according to an embodiment. Optical transmitter 200 can be structurally and/or functionally similar to optical transmitter 110 in FIG. 1. Optical transmitter 200 can be a hardware module in an optical communication system and can include an optical module 202, a digital signal processor (DSP) 204, and a controller 206. Optical transmitter 200 can be implemented using free-space optics, fiber optics, integrated optics (e.g., Si, SiN, Silica, III-V, etc. optics), or the like. Each component of optical transmitter 200 can be operatively coupled to another component of optical transmitter 200.

Controller 206 can include components and/or circuitry configured to control properties of an optical signal and/or send control signals to one or more components of optical transmitter 200. For example, controller 206 can send control signals to and thus control properties of one or more components within DSP 204 and one or more components within optical module 202. In some implementations, controller 206 can receive, from a power meter (PM) 222, signals associated with power measurements (e.g., a power imbalance) associated with an optical signal. Based on the received power measurements, controller 206 can generate control signals and send the control signals to a component(s) within DSP 204 and/or within optical module 202 to compensate for the power imbalance. In some implementations, controller 206 is a hardware device and/or software (executed on a processor) external to optical module 202. In other implementations, controller 206 is a hardware device and/or software (executed on a processor) implemented within optical module 202. Details of controller 206 are discussed herein with regards to FIG. 8.

DSP 204 can be or can include a general purpose processor, a field-programmable gate array (FPGA), an application specific integrated circuit (ASIC), a Digital Signal Processing (DSP) chip, a combination thereof, or other equivalent integrated or discrete logic circuitry. DSP 204 can receive control signals from controller 206 and send electrical signals to optical module 202 (e.g., a radio frequency (RF) amplifier 216). In some implementations, DSP 204 can be a hardware device external to optical module 202. In other implementations, DSP 204 can be a hardware device within optical module 202.

In some implementations, DSP 204 can include a forward error correction (FEC) 253, a finite impulse response (FIR) filter 252, and a digital-to-analogue converter (DAC) 251. Each component of the FEC 253, the FIR filter 252, and the DAC 251 can be operatively coupled with another component of DSP 204. In some implementations, DSP 204 can include components (not shown in FIG. 2) in addition to FEC 253, FIR filter 252, and DAC 251. Such components together with FEC 253, FIR filter 252, and DAC 251 can perform signal processing such as spectral shaping, equalizing for optical and electrical impairments, and other such signal processing for various needs.

FEC 253 can be a component included within DSP 204. In some implementations, the FEC can be external to DSP 204 and can include a general purpose processor, a field-programmable gate array (FPGA), an application specific integrated circuit (ASIC), a combination thereof, or other equivalent integrated or discrete logic circuitry. FEC 253 can be configured to correct errors in data transmission over unreliable or noisy communication channels (such as optical link 140 in FIG. 1) to improve data reliability. FEC 253 can receive original electrical data signals as input from an electrical circuit (e.g., a network processor located upstream) (not shown in the figure). FEC 253 can then encode the original data signals with redundant error-correction information (e.g., redundant parity symbols), and ultimately send the encoded data signals to an optical receiver (such as optical receiver 130 in FIG. 1). Based on the redundant error-correction information, the optical receiver can then detect and correct errors that occur during the data transmission.

FIR filter 252, included within DSP 204, is a digital filter that uses a digital signal processing technique. The FIR filter 252 can have an impulse response that is of finite duration, because it settles to zero in finite time. FIR filter 252 can receive signals from FEC 253 and send an output signal to DAC 251. The output signal from FIR filter 252 can be expressed as:

$$y(n) = \sum_{j=1}^{N} FIR_j * x(n-j), x \in \{-1, +1\} \qquad (1)$$

Where $FIR_j$ is the coefficient of the $j^{th}$ tap which is, in some implementations, a signed integer. N is the total number of taps. When $FIR_j$ has the same sign as $x(n-j)$, all terms in equation (1) can add together constructively. The maximum output from FIR filter 252 can be $$\sum_{j=1}^{N} |FIR_j|.$$

DAC 251 can receive signals from FIR filter 252 and convert those signals to analog electrical signals. The analog electrical signals can then be sent to optical module 202. In some implementations, the maximum output from DAC 251 can be $$\sum_{j=1}^{N} |FIR_j|/(2^{\wedge} Bit_{DAC}) * V_{DAC}^i,$$

where $Bit_{DAC}$ is the number of bits for a high speed DAC, and $V_{DAC}$ is the maximum output voltage for a high speed DAC. In some implementations, the output from DAC 251 can be further sent through a pluggable connector (not shown), and/or a radio frequency (RF) trace (not shown), and ultimately to RF amplifier 216.

Optical module 202 can receive electrical signals from DSP 204 and output an optical signal(s) 224 to an optical device (such as optical device 120 in FIG. 1). Optical module 202 can include an optical source 212, a tunable optical coupler (TOC) 214, a set of variable optical attenuators/amplifiers (VOAs) (247, 248, 249, 250), a radio frequency (RF) amplifier 216, a polarization beam combiner (PBC) 218, a polarization rotator 220, a power meter 222, and a Mach-Zehnder Modulator ("Modulator" or "MZM") 240. In some implementations, optical module 202 can also include a polarizer (not shown), a polarization controller (not shown), and/or a polarization splitter (not shown).

Optical source 212 can include a device capable of producing and/or transmitting an optical signal. For example, optical source 212 can include a laser diode, a semiconductor laser, and/or a continuous wave laser. Optical source 212 can be any type of laser that is usable for high bit rate optical signal transmission, for example, a narrow linewidth laser in the 1550 nm wavelength range (so-called C-Band), but can be tuned to or implemented for any wavelength.

TOC 214 can include a device and/or circuitry capable of controlling a coupling ratio of an optical signal. For example, TOC 214 can receive an optical signal from optical source 212 and cause a first portion of the optical signal to be provided to a first tributary modulator (e.g., an X channel modulator applied to an X channel 261) and a second portion of the optical signal to be provided to a second tributary modulator (e.g., an Y channel modulator applied to an Y channel 262) with a particular ratio of the first portion to the second portion. In some implementations, TOC 214 can adjust the coupling ratio based on a control signal. For example, based on receiving a control signal from controller 206, TOC 214 can adjust the coupling ratio to increase the first portion relative to the second portion, decrease the first portion relative to the second portion, or the like, thereby reducing a power imbalance of portions of the optical signal. In some implementations, TOC 214 can be included in a beam splitter (not shown) or another device (not shown) capable of splitting the optical signal or a portion thereof.

MZM 240 can modulate an optical signal received from TOC 214 with a set of electrical data signal 217 received from RF amplifier 216. For example, MZM 240 can produce a modulating signal, which can vary one or more properties (e.g., amplitude/intensity, phase, frequency/wavelength, polarization, etc.) of a carrier signal (e.g., a carrier wave) produced by optical source 212. In some implementations, MZM 240 can include or be replaced with an indium phosphide semiconductor-based modulator, an electro-absorption modulator, a phase modulator, an intensity modulator (e.g., an OOK modulator), a return to zero (RZ) modulator, a non-return to zero (NRZ) modulator, a PSK modulator, a binary PSK (BPSK) modulator, a Quad PSK (QPSK) modulator, a QAM modulator, an M-ary QAM (M-QAM) modulator, any polarization multiplexed (PM) versions of the above listed modulators (e.g., a DPBPSK modulator, a DPQAM modulator, or the like), and/or any other modulator or combination of modulators.

In some implementations, MZM 240 can cause an optical signal to be split into a set of tributary channels (e.g., a first tributary channel and a second tributary channel). For example, MZM 240 may cause the optical signal to be split into an X channel 261 and a Y channel 262, an I channel and a Q channel, an XI channel 241 and a XQ channel 242, a YI channel 243 and a YQ channel 244, or the like. In some implementations, MZM 240 may cause the optical signal to be split into a set of portions, such as a set of orthogonal portions, a set of non-orthogonal portions, or the like.

In some embodiments, MZM 240 can receive a control signal from controller 206 (via a feedback loop (not shown)), and can adjust the operating condition of MZM 240 using the control signal. For example, MZM 240 can combine the electrical data signal 217 and the control signal to adjust operational settings of VOAs 247-250 and modulate the input optical signal.

In some implementations, MZM 240 can include a set of tributary modulators 241-244. Each tributary modulator from the set of tributary modulators 241-244 can modulate an optical signal in the corresponding tributary channel from a set of tributary channels 241-244. For example, MZM 240 can include an X channel modulator 261 and an Y channel modulator 271. The X channel modulator 261 can include an XI channel modulator 241, an XQ channel modulator 242, an X channel phase shifter 245, and optional VOAs 247 and 248. The Y channel modulator 262 can include an YI channel modulator 243, an YQ channel modulator 244, an Y channel phase shifter 246, and optional VOAs 249 and 250. The XI channel modulator 241 can modulate an optical signal in the XI tributary channel; the XQ channel modulator 242 can modulate an optical signal in the XQ tributary channel; the YI channel modulator 243 can modulate an optical signal in the YI tributary channel; the YQ channel modulator 244 can modulate an optical signal in the YQ tributary channel.

In some embodiments, MZM can include a QAM modulator (not shown) with two tributary modulators, one to modulate signals on the I channel, and one to modulate signals on the Q channel. An optical coupler can combine the signals at the I and Q channels to generate the output signal. Alternatively, MZM can include a polarization modulator (not shown) with two tributary modulators, one to modulate signals at the X polarization, and one to modulate signals at the Y polarization. Returning to FIG. 2, MZM 240 can combine the signals at the X and Y polarizations to generate the output signal. For example, MZM 240 can include a dual polarization-QAM (DP-QAM) modulator (as shown in FIG. 2) with four tributary modulators 241-244, one to modulate signals at the XI channel, one to modulate signals at the XQ channel, one to modulate signals at the YI channel, and one to modulate signals at the YQ channel.

The output optical signal from at least one of the tributary channels (e.g., from XQ channel modulator 242, or YQ channel modulator 244) can be phase shifted to a particular phase with respect to another tributary channel by a phase shifter, such as X channel phase shifter 245, Y channel phase shifter 246, and/or the like. For example, the output optical signal of XQ channel modulator 242 can be phase shifted by X channel phase shifter 245 with respect to another output optical signal of XI channel modulator 241. In some implementations, X channel phase shifter 245 and/or Y channel phase shifter 246 can apply a particular phase shift (e.g., a 0 degree phase shift, a 90 degree phase shift, a 180 degree phase shift, or the like) to one of an XI channel or an XQ channel and/or one of a YI channel or a YQ channel, respectively.

VOAs 247-250 can include a device to control an optical power of an optical signal. For example, VOA 247 can receive an optical signal and can amplify or attenuate the optical signal to alter the optical power of the optical signal. In some implementations, VOA 247 can alter the optical power of the optical signal based on a control signal. For example, based on receiving a control signal from controller 206, VOA 247 can alter a level of amplification or attenuation of the optical signal or a portion thereof to reduce a power imbalance between portions of the optical signal. In some implementations, VOAs 247-250 can be optionally included or excluded from MZM 240.

The output optical signal from at least one of the tributary channels (e.g., from Y channel modulator 262) can be rotated to a particular polarization by polarization rotator 220. In some implementations, polarization rotator 220 may rotate the output optical signal from at least one of the tributary channels such that the output signal from X channel modulator 261 and the output signal from Y channel modulator 262 are orthogonal (or approximately orthogonal).

Polarization beam combiner (PBC) 218 can combine optical signals from each tributary channel and produce an output signal 224. For example, PBC 218 can receive optical signals from polarization rotator 220, which rotate optical signals from Y channel modulator 262. PBC 218 can also receive optical signals from X channel modulator 261 and combine with the optical signals from polarization rotator 220 to produce an output signal 224.

A power meter (PM) 220 can be operatively coupled to PBC 218 and controller 206 and configured to measure optical power of the output signal 224. In some implementations, PM 220 can include a photo diode, a low-speed (e.g., a less than approximately 100 Megabits per second (Mbits/s) detector) and/or a high-speed detector (e.g., a greater than approximately 100 Mbits/s detector). The total optical power of the output signal 224 can be expressed as $$P_{out} = \sum_{i} p^i \cos^2\left(\frac{\pi}{2} \frac{V_{swing}^i}{V_\pi^i} + \frac{\pi}{2} \frac{V_{bias}^i}{V_{optimal}^i}\right), i \in \{XI, XQ, YI, YQ\} \quad (2)$$

Here $P_{out}$ is the total optical power from optical module 202. $p^i$ is the power in a particular tributary channel 241-244, $V_{swing}^i$ is the peak-peak voltage swing applied to a particular channel modulator 241-244 to create phase shift, $V_\pi$ is the peak-peak voltage swing required to achieve 180-degree phase shift, $V_{bias}^i$ is the bias voltage applied to a particular channel modulator 241-244, $V_{optimal}$ is the bias voltage required for null point (minimum output power). $\cos^2(\ )$ is the transfer function of MZM 240. In some implementations, for simplicity purpose, the quadrature bias point between I tributary channel and Q tributary channel is set to be optimal, and the polarization extinction ratio between X polarization and Y polarization is set to be sufficiently large. Thus, in such implementations, substantially no beating power occurs between tributary channels. In some implementations, the bias voltage $V_{bias}$ can be set within optical module 202 through a closed control loop. The peak-peak voltage swing $V_{swing}$ can be adjusted by changing the tap coefficients of FIR filter 252.

Considering the output power from FIR filter 252 and the output power from DAC 251, the peak-peak voltage swing can be $$V_{swing}^i = \sum_{j=1}^{N} |FIR_j^i|/(2^{\wedge} Bit_{DAC}) * V_{DAC}^i * IL_{trace}^i * Gain_{amp}^i \quad (3)$$

where $IL_{trace}$ is the insertion loss of RF traces (not shown in FIG. 2) output from DAC 251 and to be input into MZM 240, including loss of pluggable connector (not shown); $Gain_{amp}$ is the gain of linear RF amplifier 216.

The tap coefficients of FIR filter 252 can be set to provide a certain amount of gain (for example, 6 dB) at Nyquist frequency to compensate the RF insertion loss introduced by RF traces and pluggable connector. In some implementations, a spectral response of FIR filter 252 is determined by the ratio between taps of FIR filter 252. When a scale factor $$\left(Scale^i = \sum_{j=1}^{N} |FIR_j^i|/\sum_{j=1}^{N} |FIR_j^i|_{ini}\right)$$

Figure 3:
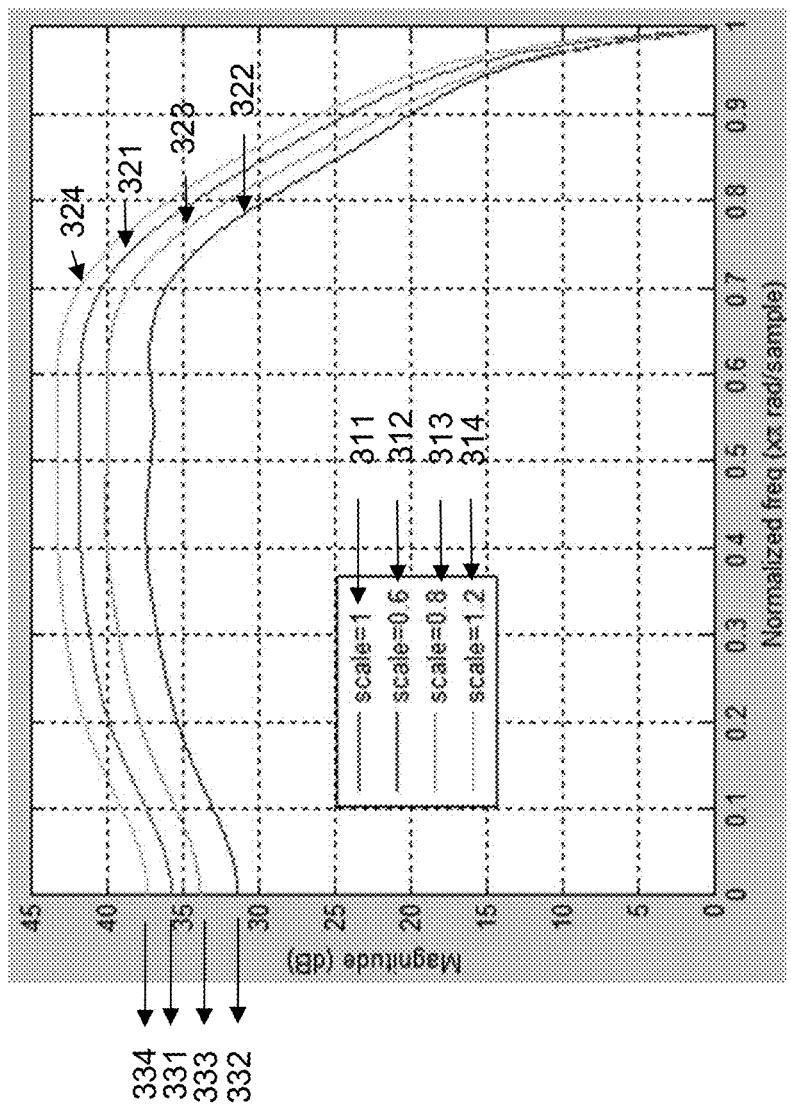
FIG. 3 is a graph illustrating an output response of a FIR filter in response to change of frequency, according to an embodiment.

(also referred to herein as a "scaling factor") is applied to all the tap coefficients, the spectral response does not change and the output power from FIR filter 252 is changed by the scaling factor (as shown in FIG. 3). In other words, as shown in FIG. 3, when different scaling factors 311-314 are applied to tap coefficients, the filter shapes 321-324 (i.e., the output response 302 of FIR filter versus frequency 301) remain the same. Filter shape 324 corresponds to a scale factor of 1.2; filter shape 321 corresponds to a scale factor of 1; filter shape 323 corresponds to a scale factor of 0.8; filter shape 322 corresponds to a scale factor of 0.6. The output responses 331-334 are different for each scale factors 311-314, while the filter shapes 321-324 remain substantially the same among different scale factors 311-314. Similarly stated, the output power 302 of the FIR filter (as shown as 252 in FIG. 2) is changed linearly by the scale factor 311-314. In some implementations, an initial setting point of FIR filter 252 with 6 dB peaking value can be defined as $$\sum_{j=1}^{N} |FIR_j^i|_{ini} = 212.$$

For example, with a DAC having a number of bits of 8 and a maximum output of 256 levels, the scaling factor can be set between 0 to 1.2.

Returning back to FIG. 2, in some instances, a swing factor $\alpha^i$ and a bias factor $\beta^i$ can be defined to replace the $V_{swing}$ factor and $V_{bias}$ factor in equation (2) of the total optical power of output signal 224:

$$\alpha^i = \frac{V_{DAC}^i}{2V_\pi^i} * \sum_{j=1}^{N} |FIR_j^i|_{ini} * IL_{trace}^i * Gain_{amp}^i/(2^\wedge Bit_{DAC}), \quad (4)$$

$$\beta^i = \frac{V_{bias}^i}{V_{optimal}^i}$$

$$P_{out} = \sum_{i} p^i \cos^2\left(\frac{\pi}{2}\alpha^i * Scale^i + \frac{\pi}{2}\beta^i\right)$$

In these embodiments, α can be associated with the voltage swing applied to MZM 240 to produce a phase shift in the output signal 224. β can be associated with the bias point relative to an optimal point when applied to MZM 240.

In some embodiments, power imbalances can be determined and compensated (1) during a calibration (e.g., initial power-up with no live traffic, module reconfiguration, module switching to a new channel, etc.) of the optical transmitter 200, (2) a signal transmission phase (or an operational phase; e.g., with live traffic) of the optical transmitter 200, and/or (3) on demand from an optical receiver (e.g., 130 in FIG. 1). When power imbalances are compensated on demand from an optical receiver (e.g., 130 in FIG. 1), the optical receiver (e.g., 130 in FIG. 1) can measure signal-to-noise ratio (SNR) of two polarizations of an optical signal. When the SNR of either polarization of the optical signal exceeds a predetermined threshold, the optical receiver (e.g., 130 in FIG. 1) can send signals to optical transmitter (e.g., 110 in FIG. 1 or 200 in FIG. 2) to trigger the power imbalance compensation.

During a calibration of the optical transmitter 200, controller 206 can initially send a signal to FIR filter 252 to keep the scale factors of the set of tributary channels (XI tributary channel 241, XQ tributary channel 242, YI tributary channel 243, and YQ tributary channel 244) as one. Accordingly, $P_{out}$ in equation (4) can be $$P_{ini} = \sum_{i=XI,XQ,YI,YQ} p^i \cos^2\left(\frac{\pi}{2}\alpha^i + \frac{\pi}{2}\beta^i\right) \quad (5)$$

In some implementations, controller 206 can then adjust (or sweep) the scale factor of one tributary channel of the set of tributary channels (e.g., XI tributary channel 241) while keeping the scale factors of the other tributary channels (e.g., XQ tributary channel 242, YI tributary channel 243, and YQ tributary channel 244) of the set of tributary channels as one. The adjustment range of the scale factor the tributary channel can be between 0 and 1.2, or substantially between 0 and 1.2. Accordingly, $P_{out}$ in equation (4) for one tributary channel (e.g., XI tributary channel 241) can be $$P_{\Delta XI}(Scale^{XI}) = \quad (6)$$
$$p^{XI}\cos^2\left(\frac{\pi}{2}\alpha^{XI} * Scale^{XI} + \frac{\pi}{2}\beta^{XI}\right) + \sum_{i=XQ,YI,YQ} p^i \cos^2\left(\frac{\pi}{2}\alpha^i + \frac{\pi}{2}\beta^i\right)$$

$$dP_{XI}(Scale^{XI}) = P_{\Delta XI} - P_{ini} =$$
$$p^{XI}\cos^2\left(\frac{\pi}{2}\alpha^{XI} * Scale^{XI} + \frac{\pi}{2}\beta^{XI}\right) - p^{XI}\cos^2\left(\frac{\pi}{2}\alpha^{XI} + \frac{\pi}{2}\beta^{XI}\right)$$

By adjusting the scale factor of one tributary channel, a curve of $dP^{XI}$ vs. $Scale^{XI}$ can be determined by controller 206. Subsequently, an optimization procedure can be performed to minimize $$\sum_{m=1}^{M} [dP_{XI}^{Meas}(m) - dP_{XI}^{Fit}(m)]^2/M.$$

Here, $dP^{Meas}$ is the measurement result, $dP^{Fit}$ is the fitting result using equation above, and M is the number of measurement points. Thus, three fitting parameters, $p^{XI}$, $\alpha^{XI}$, $\beta^{XI}$ for one tributary channel (e.g., XI tributary channel 241) can be determined. Similarly, the fitting parameters, p, α, β for each tributary channel of the set of tributary channels can be determined.

In these embodiments, controller 206 can determine power imbalance between XI tributary channel 241 and XQ tributary channel 242 based on the fitting parameters (p, α, β) of XI tributary channel 241 and XQ tributary channel 242. Similarly, controller 206 can determine power imbalance between YI tributary channel 243 and YQ tributary channel 244 based on the fitting parameters (p, α, β) of YI tributary channel 243 and YQ tributary channel 244. Similarly, controller 206 can determine power imbalance between X tributary channel 261 and Y tributary channel 262 based on the fitting parameters (p, α, β) of X tributary channel 261 and Y tributary channel 262. The power imbalances between XI tributary channel 241 and XQ tributary channel 242, between YI tributary channel 243 and YQ tributary channel 244, and between X tributary channel 261 and Y tributary channel 262 can be determined based on the following equations, respectively, $$IMB_{IQ\_X} = 10 * \log_{10} \frac{p^{XI}\cos^2(\pi\alpha^{XI}/2 + \pi\beta^{XI}/2)}{p^{XQ}\cos^2(\pi\alpha^{XQ}/2 + \pi\beta^{XQ}/2)} \quad (7)$$

$$IMB_{IQ\_Y} = 10 * \log_{10} \frac{p^{YI}\cos^2(\pi\alpha^{YI}/2 + \pi\beta^{YI}/2)}{p^{YQ}\cos^2(\pi\alpha^{YQ}/2 + \pi\beta^{YQ}/2)}$$

-continued $$IMB_{XY} = 10 * \log_{10} \frac{p^{XI}\cos^2(\pi\alpha^{XI}/2 + \pi\beta^{XI}/2) + p^{XQ}\cos^2(\pi\alpha^{XQ}/2 + \pi\beta^{XQ}/2)}{p^{YI}\cos^2(\pi\alpha^{YI}/2 + \pi\beta^{YI}/2) + p^{YQ}\cos^2(\pi\alpha^{YQ}/2 + \pi\beta^{YQ}/2)}$$

Once the power imbalances between tributary channels (e.g., a power imbalance between a first tributary channel and a second tributary channel) are determined, controller 206 can determine a root cause (or root causes) of the power imbalance based on (1) the power imbalance between tributary channels (e.g., a power imbalance between a first tributary channel and a second tributary channel) and (2) the fitting parameters (p, α, β) of tributary channels (e.g., a first tributary channel and a second tributary channel). Controller 206 can subsequently adjust a set of operational settings associated with the root cause such that the power imbalance is reduced (or compensated).

In some implementations, the fitting parameter, p, of a tributary channel is associated with a raw power value in that tributary channel. The fitting parameter, α, of a tributary channel is associated with a peak-peak voltage swing applied by the RF amplifier 216 for that tributary channel. The fitting parameter, β, of a tributary channel is associated with a bias voltage applied by a bias control circuit of the optical transmitter 200 for that tributary channel.

In some implementations, if the fitting parameter, p, of a tributary channel is the root cause of a power imbalance, controller 206 can send control signals to and adjust properties of (1) the VOA of that tributary channel from the set of VOAs 247-250, (2) a semiconductor optical amplifier (not shown in FIG. 1), and/or (3) the TOC 214. If the fitting parameter, α, of a tributary channel is the root cause of a power imbalance, controller 206 can send control signals to and adjust properties of (1) FIR filter 252 such that the tap coefficients and the scale factor of that tributary channel are adjusted, and/or (2) a gain setting of RF amplifier 216 in a manual gain control (MGC) mode. If the fitting parameter, β, of a tributary channel is the root cause of a power imbalance, controller 206 can send control signals to and adjust properties settings of bias control loop such that the bias voltage is adjusted. In some embodiments, any combination of these adjustments can be made to compensate power imbalances and improve performance of optical transmitter 200.

In some implementations, to adjust peak-peak voltage swing ($V_{swing}$) applied by the RF amplifier 216 for that tributary channel, the RF amplifier 216 can work in the manual gain control (MGC) mode such that the output voltage of RF peak detector output matches that in an automatic gain control (AGC) mode.

In alternative implementations, instead of sweeping the scale factors associated with the tap coefficients of FIR filter 252 during a calibration phase of optical transmitter 200, controller 206 can adjust (or sweep) the gain setting of RF amplifier 216 and keep the tap coefficients of FIR filter 252 unchanged. The gain scale factor can be defined as GainScale=$Gain_{amp}$/$Gain_{amp-ini}$, where $Gain_{amp}$ is the gain setting point for RF amplifier 216, and $Gain_{amp-ini}$ is the initial gain setting point for RF amplifier 216. The swing factor $\alpha^i$, the bias factor $\beta^i$, and the total optical power of output signal 224 in equation (4) can be rewritten as:

$$\alpha^i = \frac{V_{DAC}^i}{2V_\pi^i} * \sum_{j=1}^{N} |FIR_j^i|_{ini} * IL_{trace}^i * Gain_{amp\_ini}^i / (2^\wedge Bit_{DAC}), \quad (4')$$

$$\beta^i = \frac{V_{bias}^i}{V_{optimal}^i}$$

$$P_{out} = \sum_i p^i \cos^2\left(\frac{\pi}{2}\alpha^i * GainScale^i + \frac{\pi}{2}\beta^i\right),$$

$$GainScale^i = Gain_{amp}^i / Gain_{amp\_ini}^i$$

Accordingly, in these implementations, controller 206 can determine the fitting parameters p, α, β similarly by sweeping the gain scale factor associated with the gain setting of RF amplifier 216.

Figure 7:
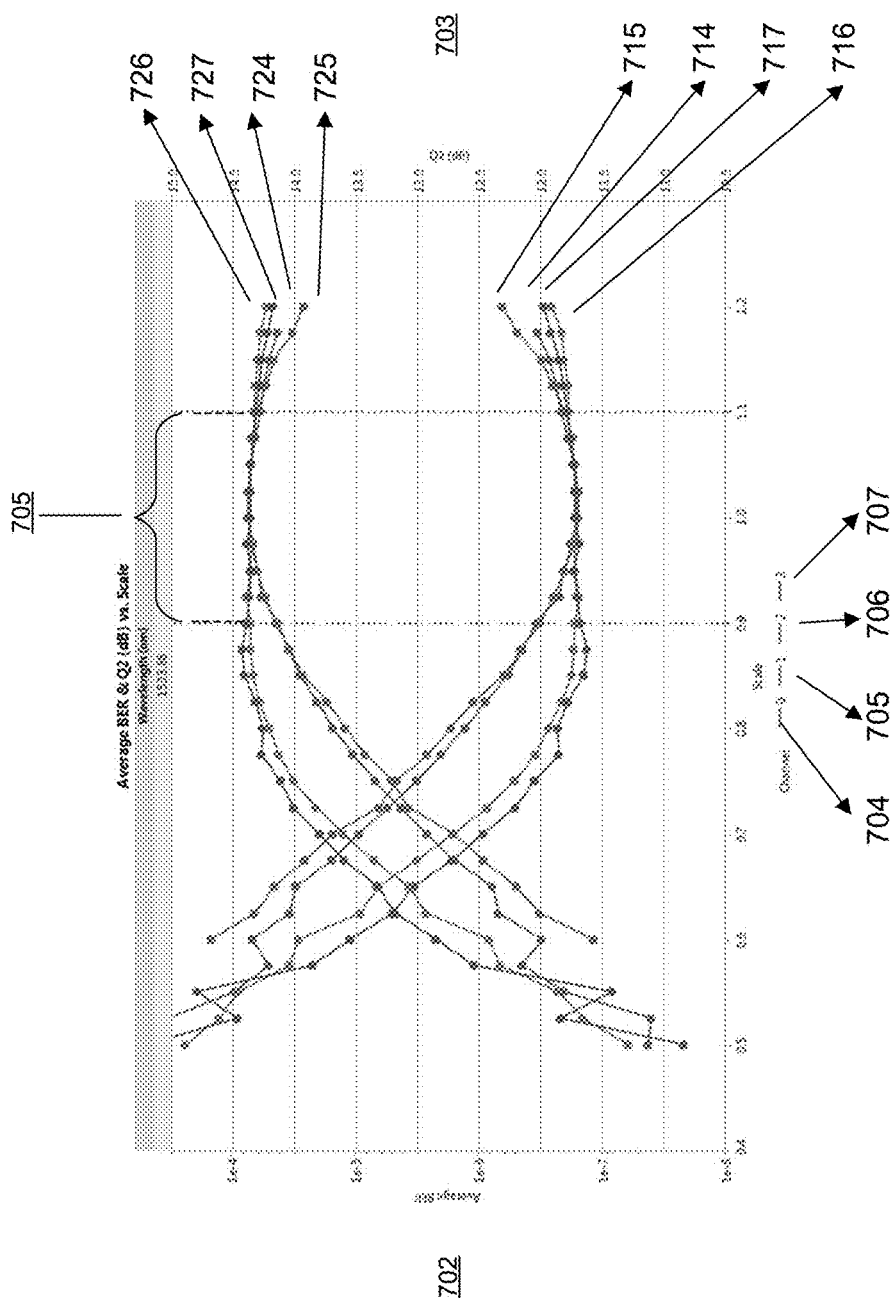
FIG. 7 shows a graph illustrating a bit-error-rate (BER) and a quality factor ($Q^2$) in response to a change of the scale factor, according to an embodiment.

In some embodiments, during a signal transmission phase (e.g., with live traffic) of optical transmitter 200, controller 206 can send control signals to FIR filter 252 and adjust the scale factor for each tributary channel in a smaller range, for example, between 0.9 to 1.1 (compared to a greater range between 0 to 1.2 when optical transmitter 200 is in a calibration phase), to determine root cause(s) of power imbalances. FIG. 7 shows a graph illustrating a bit-error-rate (BER) 702 and a quality factor ($Q^2$) 703 in response to a change of the scale factor 701. Each curve represents a Q2 curve 724-727 or a BER curve 714-717 for a channel associated with a wavelength from a set of channels 704-707 (e.g., in a wavelength-division multiplexing (WDM) system). When the scale factor is in the range between 0.9 and 1.1, the impact on BER and $Q^2$ is relatively small and thus, the impact on data traffic is small in response to the change of the scale factor.

During the signal transmission phase of optical transmitter 200, in some implementations, by performing Taylor expansion of equation (4) near $Scale^i=1$, $dP_i$ is roughly linear with $Scale^i$ as shown in the equation (8) below.

$$dP_i \approx -p^i \sin(\pi\alpha^i + \pi\beta^i)\pi\alpha^i * (Scale_i - 1)/2 \quad (8)$$

$$slope^i = \frac{dP_i}{Scale_i - 1} \approx -p^i \sin(\pi\alpha^i + \pi\beta^i)\pi\alpha^i/2,$$

$$i = XI, XQ, YI, YQ$$

The power imbalances between XI tributary channel 241 and XQ tributary channel 242, between YI tributary channel 243 and YQ tributary channel 244, and between X tributary channel 261 and Y tributary channel 262, during a signal transmission phase of optical transmitter 200, can be determined based on the following equations, respectively, $$IMB_{IQ,X} \approx 10 * \log_{10} \frac{slope^{XI}}{slope^{XQ}}, \quad (9)$$

$$IMB_{IQ,Y} \approx 10 * \log_{10} \frac{slope^{YI}}{slope^{YQ}}$$

$$IMB_{XY} \approx 10 * \log_{10} \frac{slope^{XI} + slope^{XQ}}{slope^{YI} + slope^{YQ}}$$

In other words, during a signal transmission phase of optical transmitter 200, controller 206 can send control signals to FIR filter 252 and adjust the scale factor for each tributary channel in a predetermined range between 0.9 and 1.1 (or substantially close to a range between 0.9 and 1.1), less than a predetermined range between 0 and 1.2 (or substantially close to a range between 0 and 1.2) when optical transmitter 200 is in a calibration phase. The range is substantially close to a range between 0.9 and 1.1 between a signal transmission phase, or between 0 and 1.1 during a calibration phase when the range is within a predetermined threshold of the predetermined ranges.

Based on the change of scale factor for each tributary channel, controller 206 can receive signals from the power meter indicating the total optical power of the output signal 224 and then determine a slope of power change for each tributary channel. Based on equation (9), controller 206 can then determine estimated power imbalances between XI tributary channel 241 and XQ tributary channel 242, between YI tributary channel 243 and YQ tributary channel 244, and between X tributary channel 261 and Y tributary channel 262. Similar to the compensation process discussed herein when optical transmitter 200 is in a calibration phase, controller 206 can send control signals to optical transmitter 200 to adjust at least one operational setting from a set of operational settings of optical transmitter 200 based on the estimated power imbalances such that the estimated power imbalances are reduced during the signal transmission phase of the coherent optical transmitter. For example, controller 206 can send control signals to and adjust properties of VOAs 247-250, semiconductor optical amplifier (not shown in FIG. 2), TOC 214, FIR filter 252, RF amplifier, and/or bias control loop such that power imbalances are reduced.

Figure 4:
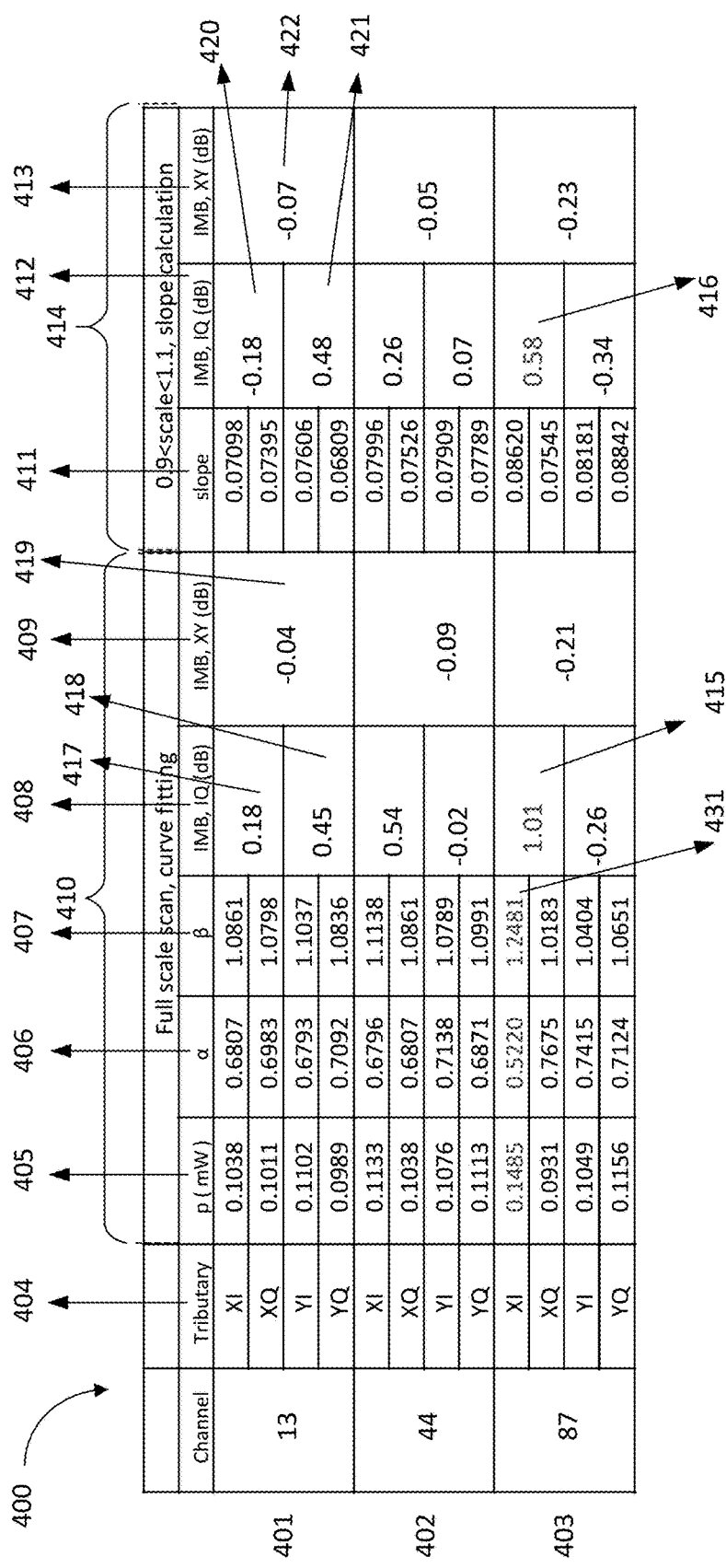
FIG. 4 is a table illustrating an example of power imbalance determination for three channels of a coherent optical transmitter, according to an embodiment.

FIG. 4 is a table illustrating an example of power imbalance determination for three channels of a coherent optical transmitter, according to an embodiment. Three channels 401-403 of a coherent optical transmitter (e.g., a DP-QAM optical transmitter as shown in FIG. 2), represented in table 400, are associated with wavelength specific channels in, for example, a wavelength-division multiplexing (WDM) system. Each channel includes four tributary channels 404, XI, XQ, YI. Columns 410 represent power imbalance calculations when the coherent optical transmitter is in a calibration phase (e.g., initial power-up with no live traffic, module reconfiguration, module switching to a new channel, etc.). Columns 414 represent power imbalance calculations when the coherent optical transmitter is in a signal transmission phase (or an operational phase; e.g., with live traffic).

During a calibration of the coherent optical transmitter, for each channel of the set of channels 401-403, scale factors of three tributary channels from the set of tributary channels 404 can first be kept as 1. A controller (such as controller 206 in FIG. 2) can scan (or sweep, or adjust) the scale factor of one tributary channel from the set of tributary channels within a predetermined range of 0 to 1.2. By measuring the total optical power of an output signal (e.g., 224 in FIG. 2) and based on equation (6), the controller can determine fitting parameters, p, α, β, 405-407, for that tributary channel. Once fitting parameters for each tributary channel of the set of tributary channels 404 are determined and based on equation (7), the controller can calculate power imbalances between XI tributary channel and XQ tributary channel 408, between YI tributary channel and YQ tributary channel 408, and between X tributary channel and Y tributary channel 409.

For example, during a calibration phase of the coherent optical transmitter and for channel 13, 401, the controller can first keep the scale factors of XQ tributary channel, YI tributary channel, and YQ tributary channel as 1 and scan the scale factor of XI tributary channel in a predetermined range between 0 and 1.2. The controller can receive signals from a power meter (e.g., PM 222 in FIG. 2) indicating the total optical power of an output signal (e.g., 224 in FIG. 2) in response to the scan of the scale factor of XI tributary channel. Based on equation (6) and an optimization procedure, controller can determine fitting parameters, p, α, β, for XI tributary channel. The controller then can keep the scale factors of XI tributary channel, YI tributary channel, and YQ tributary channel as 1 and scan the scale factor of XQ tributary channel in a predetermined range between 0 and 1.2. The controller can receive signals from a power meter (e.g., PM 222 in FIG. 2) indicating the total optical power of an output signal (e.g., 224 in FIG. 2) in response to the scan of the scale factor of XQ tributary channel. Based on equation (6) and an optimization procedure, the controller can determine fitting parameters, p, α, β, for XQ tributary channel. Similarly, the controller can determine fitting parameters, p, α, β, for YI tributary channel and YQ tributary channel. Based on the fitting parameters of XI tributary channel and XQ tributary channel and equation (7), the controller can determine power imbalance between XI tributary channel and XQ tributary channel 417, power imbalance between YI tributary channel and YQ tributary channel 418, and power imbalance between X tributary channel and Y tributary channel 419.

During a signal transmission phase of the coherent optical transmitter, for each channel of the set of channels 401-403, scale factors of three tributary channels from the set of tributary channels 404 can first be kept as 1. A controller (such as controller 206 in FIG. 2) can scan (or sweep, or adjust) the scale factor of one tributary channel from the set of tributary channels within a predetermined range of 0.9 and 1.1. The controller can receive signals from power meter indicating the total optical power of the output signal 224 and then determine a slope of power change for that tributary channel. The controller can repeat the steps for each tributary channel and determine a slope of power change 411 for each tributary channel. Based on equation (9), the controller can then determine estimated power imbalances between XI tributary channel and XQ tributary channel, between YI tributary channel and YQ tributary channel 412, and between X tributary channel and Y tributary channel 413.

For example, during a signal transmission phase of the coherent optical transmitter and for channel 13, 401, the controller can first keep the scale factors of XQ tributary channel, YI tributary channel, and YQ tributary channel as 1 and scan the scale factor of XI tributary channel in a predetermined range between 0.9 and 1.1. The controller can receive signals from a power meter (e.g., PM 222 in FIG. 2) indicating the total optical power of an output signal (e.g., 224 in FIG. 2) in response to the scan of the scale factor of XI tributary channel. The controller can then determine a slope of power change for XI tributary channel 423. The controller then keeps the scale factors of XI tributary channel, YI tributary channel, and YQ tributary channel as 1 and scan the scale factor of XQ tributary channel in a predetermined range between 0.9 and 1.1. Upon receiving signals from the power meter indicating the total optical power of an output signal in response to the scan of the scale factor of XQ tributary channel, the controller can determine a slope of power change for XQ tributary channel. Based on the slope of power change for XI tributary channel, the slope of power change for XQ tributary channel, and equation (9), the controller can then determine an estimated power imbalance 420 between XI tributary channel and XQ tributary channel. Similarly, the controller can determine power imbalance 421 between YI tributary channel and YQ tributary channel, and power imbalance 422 between X tributary channel and Y tributary channel.

As shown in FIG. 4, in most circumstances, the power imbalance between a first tributary channel and a second tributary channel during a calibration of the coherent optical transmitter is substantially close to the power imbalance between the first tributary channel and the second tributary channel during a signal transmission phase of the coherent optical transmitter. For example, for channel 13, the power imbalance between XI and XQ tributary channels is 0.18 during a calibration phase 417, and −0.18 during a signal transmission phase 420. The power imbalance between YI and YQ tributary channels is 0.45 during a calibration phase 418, and 0.48 during a signal transmission phase 421. The power imbalance between X and Y tributary channels is −0.04 during a calibration phase 419, and −0.07 during a signal transmission phase 422.

In some circumstances, for example for channel 87, 403, the power imbalance between XI and XQ tributary channel is 1.01 during a calibration phase 415, while it is 0.58 during a signal transmission phase 416. The root cause of this relatively greater difference can be the fitting parameter, ft, for XI tributary channel. The bias point of XI tributary ($\beta$=1.24) 431 is significantly different from the optimal point, which leads to the relatively greater difference in the power imbalance. In some implementations, the bias drift can be detected and corrected during the initial power-up process (or calibration phase). With this drift of bias point, however, the estimation error can still be less than 0.5 dB, demonstrating the feasibility of in-flight (or with live traffic) measurement and compensation of power imbalance.

Figure 5:
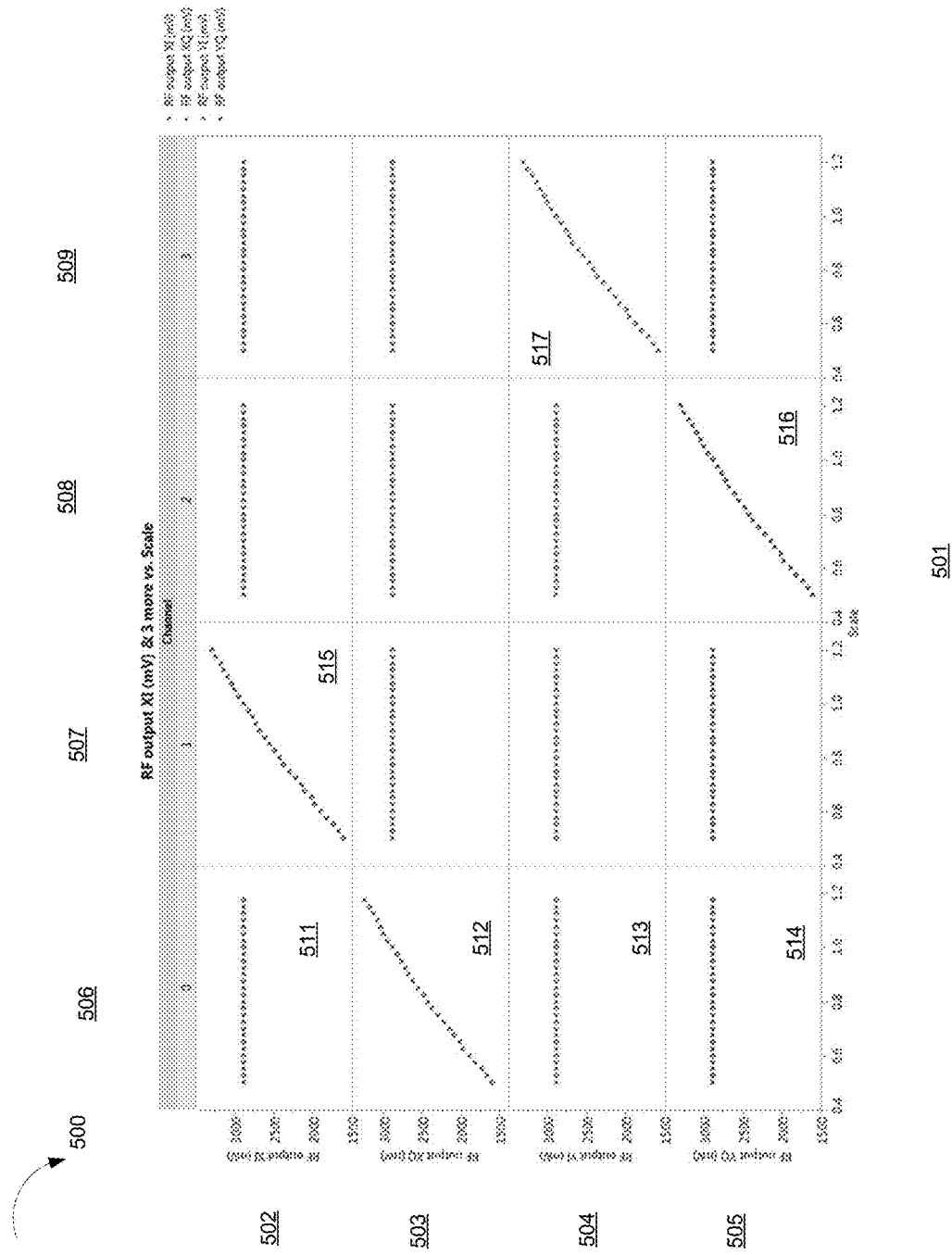
FIG. 5 is a graph illustrating the output peak voltage of RF amplifier in response to changes of a scale factor, according to an embodiment.

FIG. 5 is a graph illustrating the output peak voltage of RF amplifier in response to changes of a scale factor, according to an embodiment. The graph 500 shows output peak voltages of RF amplifier 506-509 for four wavelength specific channels (e.g., in a WDM system) of a coherent optical transmitter in response to change of scale factors 501, during a calibration phase of the coherent optical transmitter. For each channel 506-509, graph 500 shows output peak voltages of RF amplifiers for each tributary channel (XI, XQ, YI, YQ) 502-505. Specifically, for channel 0, 506, when a controller (e.g., controller 206 in FIG. 2) sweeps a scale factor for XQ tributary channel 512, the output peak voltage of RF amplifier changes linearly with the scale factor. The output peak voltages for XI tributary channel 511, YI tributary channel 513, and YQ tributary channel 514 remain the same as the scale factor for these tributary channels remain unchanged. Similarly for channel 1, 507, when the controller sweeps a scale factor for XI tributary channel 515, the output peak voltage of RF amplifier changes linearly with the scale factor. Similarly for channel 2, 508, when the controller sweeps a scale factor for YQ tributary channel 516, the output peak voltage of RF amplifier changes linearly with the scale factor. Similarly for channel 3, 509, when the controller sweeps a scale factor for YI tributary channel 517, the output peak voltage of RF amplifier changes linearly with the scale factor.

Figure 6A:
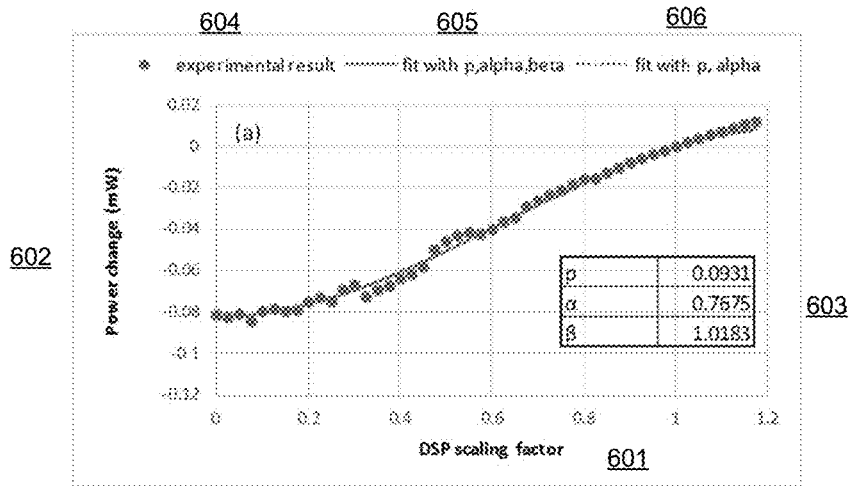
FIGS. 6A-6C are graphs illustrating a power change in response to a change of a scale factor, according to an embodiment.
Figure 6B:
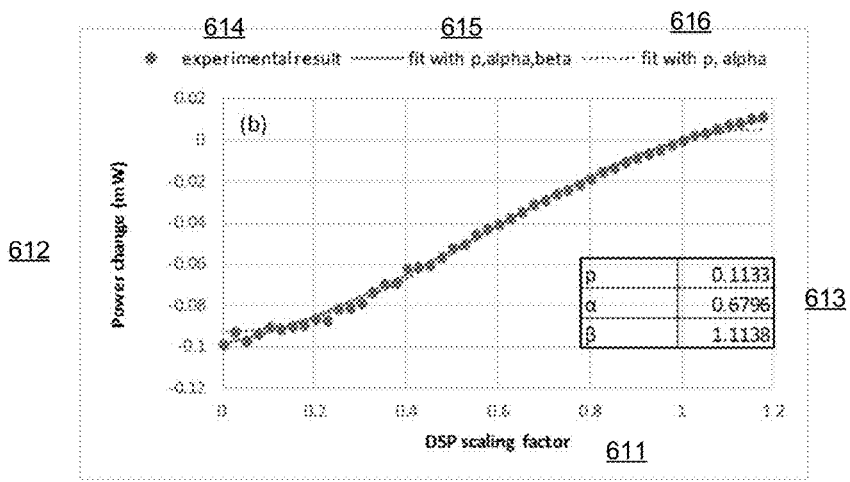
Figure 6C:
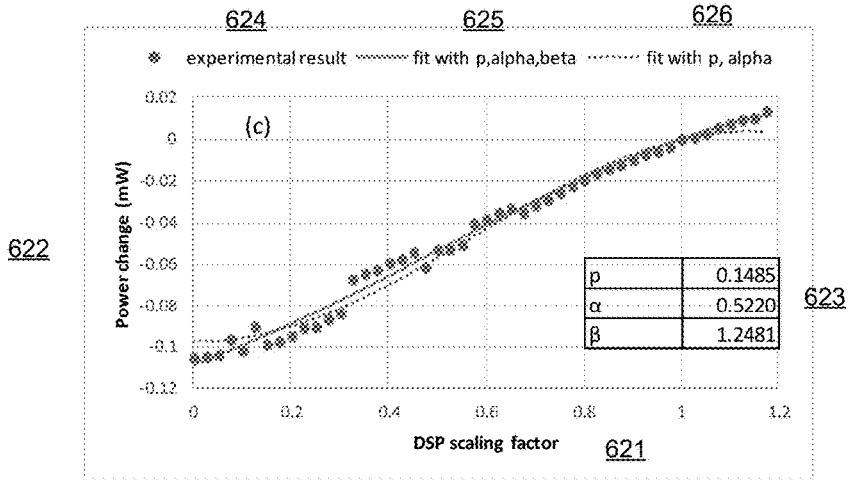

FIGS. 6A-6C are graphs illustrating a power change in response to a change of a scale factor, according to an embodiment. FIG. 6A is a graph illustrating a power change $(dP_i)$ 602 of a tributary channel in response to a scale factor 601 for a set of fitting parameters 603 (p=0.0931, $\alpha$=0.7675, $\beta$=1.0183). The large dots 604 are experimental results of the power change, the solid line 605 is a fitting curve fitted with three fitting parameters p, $\alpha$, $\beta$, and the dotted line 606 is a fitting curve fitted with two fitting parameters p, $\alpha$. FIG. 6B is a graph illustrating a power change $(dP_i)$ 612 of a tributary channel in response to a scale factor 611 for a set of fitting parameters 613 (p=0.1133, $\alpha$=0.6796, $\beta$=1.1138). Similarly, the large dots 614 are experimental results of the power change, the solid line 615 is a fitting curve fitted with three fitting parameters p, $\alpha$, $\beta$, and the dotted line 616 is a fitting curve fitted with two fitting parameters p, $\alpha$. FIG. 6C is a graph illustrating a power change $(dP_i)$ 622 of a tributary channel in response to a scale factor 621 for a set of fitting parameters 623 (p=0.1485, $\alpha$=0.5220, $\beta$=1.2481). Similarly, the large dots 624 are experimental results of the power change, the solid line 625 is a fitting curve fitted with three fitting parameters p, $\alpha,\beta$, and the dotted line 626 is a fitting curve fitted with two fitting parameters p, $\alpha$.

The fitting parameter $\beta$ of a tributary channel is associated with a bias voltage applied by a bias control circuit of the optical transmitter for that tributary channel. In FIG. 6A, the fitting parameter $\beta$ is equal to 1.0183, which is closer to the optimal bias point. In FIG. 6B, the fitting parameter $\beta$ is equal to 1.1138, which is close to 10% drift from the optimal bias point. In FIG. 6C, the fitting parameter $\beta$ is equal to 1.2481, which deviates further away from the optimal bias point, compared to the fitting parameter $\beta$ in FIG. 6B. The comparison between the fitting curve fitted with three fitting parameters p, $\alpha$, $\beta$ (605, 615, 625) with the fitting curve fitted with two fitting parameters p, $\alpha$ (606, 616, 626) shows that when the fitting parameter $\beta$ is included, the results fit better with the experimental results of the power change (604, 614, 624). In some implementations, even with automatic bias control, the bias point can deviate from the optimal bias point (e.g., FIG. 6C), with $\beta$ as large as 1.2481. In such implementations, the fitting parameter $\beta$ can be close to 1, the optimal point, to achieve better fitting results.

Figure 8:
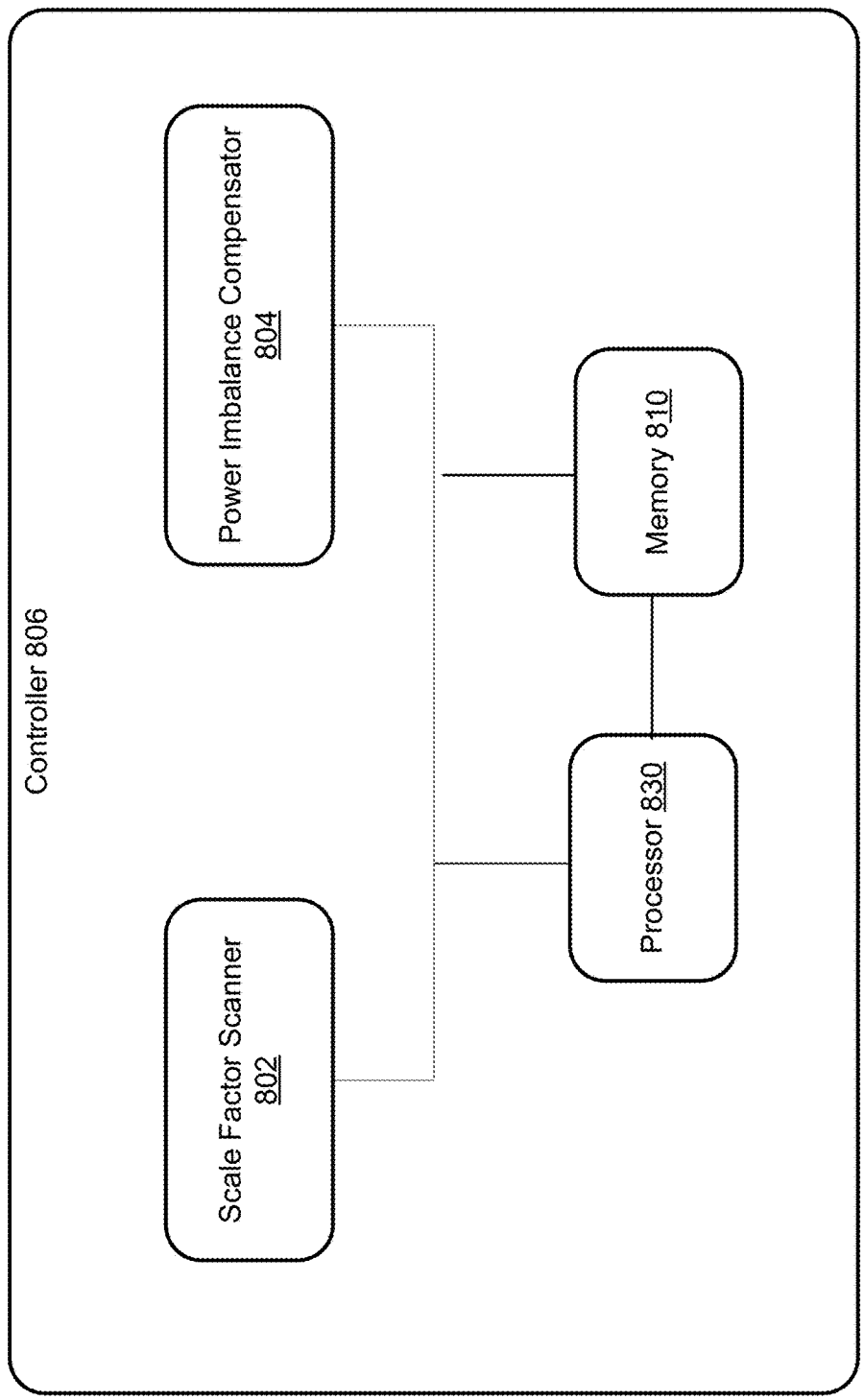
FIG. 8 is a block diagram illustrating a controller in an optical transmitter, according to an embodiment.

FIG. 8 is a block diagram illustrating a controller in an optical transmitter, according to an embodiment. Controller 806 can be structurally and functionally similar to controller 206 described with regards to FIG. 2. In some embodiments, controller 806 is a hardware device and/or software (executed on a processor) external to an optical module (such as the optical module 202 described with regards to FIG. 2) within an optical transmitter. In other embodiments, controller 806 is a hardware device and/or software (executed on a processor) implemented within the optical module of the optical transmitter. As discussed with regards to FIG. 2, controller 806 can be operatively coupled to a DSP within the optical transmitter and a PM within the optical module.

In some embodiments, controller 806 can be or can include a general purpose processor, a field-programmable gate array (FPGA), an application specific integrated circuit (ASIC), a combination thereof, or other equivalent integrated or discrete logic circuitry. Controller 806 can include a processor 830, a memory 810, a scale factor scanner 802, and a power imbalance compensator 804.

Each module or component in controller 806 can be operatively coupled to each remaining module or component. Each module or component in controller 806 can be any combination of hardware and/or software (stored and/or executing in hardware) capable of performing one or more specific functions associated with that module. In some implementations, a module or a component in controller 806 can include, for example, a field-programmable gate array (FPGA), an application specific integrated circuit (ASIC), a digital signal processor (DSP), and/or the like.

The processor 830 can be or can include a general purpose processor, a field-programmable gate array (FPGA), an application specific integrated circuit (ASIC), a combination thereof, or other equivalent integrated or discrete logic circuitry, a software-based module (e.g., a module of computer code executed at a processor, a set of processor-readable instructions executed at a processor), and/or a combination of hardware- and software-based modules. The processor 830 can be or include any processing device or component configured to perform the data collecting, processing and transmitting functions as described herein. The processor 830 can be configured to, for example, write data into and read data from the memory 810, and execute the instructions stored within the memory 810. Processor 830 can also be configured to execute and/or control, for example, the operations of the scale factor scanner 802, and the power imbalance compensator during an operational phase of an optical transmitter 804. In some implementations, based on the methods or processes stored within the memory 810, the processor 830 can be configured to execute power imbalance compensation processes, as described in FIGS. 9-10.

The memory 810 can be, for example, a random-access memory (RAM) (e.g., a dynamic RAM, a static RAM), a flash memory, a removable memory, and/or so forth. In some embodiments, the memory 830 can include, for example, a database, process, application, virtual machine, and/or some other software modules (stored and/or executing in hardware) or hardware modules configured to execute a power imbalance compensation process. In such implementations, instructions of executing the power imbalance compensation process and/or the associated methods can be stored within the memory 810 and executed at the processor 830.

The scale factor scanner 802 (or the processor 830) can be configured to send control signals to a FIR filter (such as the FIR filter 252 described with regards to FIG. 2) to adjust tap coefficients of the FIR filter and thus adjust the scale filter. The tap coefficients of FIR filter 252 can be set to provide a certain amount of gain (for example, 6 dB) at Nyquist frequency to compensate the RF insertion loss introduced by RF traces and pluggable connector. The scale factor is defined as $$Scale^i = \sum_{j=1}^{N} |FIR_j^i| / \sum_{j=1}^{N} |FIR_j^i|_{ini},$$

where $FIR_j^i$ is a tap coefficient of the FIR filter. In some implementations, an initial setting point of FIR filter 252 with 6 dB peaking value can be defined as $$\sum_{j=1}^{N} |FIR_j^i|_{ini} = 212.$$

For example, with a DAC having a number of bits of 8 and a maximum output of 256 levels, the scaling factor can be set between 0 to 1.2.

During a calibration phase of the optical transmitter, the scale factor scanner 802 (or the processor 830) can be configured to send control signals to the FIR filter to adjust a scale factor for a tributary channel within a predetermined range of 0 to 1.2, while keeping the scale factors for the other tributary channels unchanged as one. During a signal transmission phase of the optical transmitter, the scale factor scanner 802 (or the processor 830) can be configured to send control signals to the FIR filter to adjust a scale factor for a tributary channel within a predetermined range of 0.9 to 1.1, while keeping the scale factors for the other tributary channels unchanged as one.

Alternatively, the scale factor associated with the FIR filter 252 can be kept unchanged. For example, the scale factor can be kept as the initial setting point of FIR filter $$252 \sum_{j=1}^{N} |FIR_j^i|_{ini} = 212.$$

Instead, scale factor scanner 802 can be configured to send control signals to the RF amplifier (such as RF amplifier 216 in FIG. 2) to sweep the gain scale factor (GainScale=$Gain_{amp}$/$Gain_{amp-ini}$) associated with the gain setting of the RF amplifier. The RF amplifier can be under MGC mode to perform the sweeping.

During a calibration phase of the optical transmitter, the power imbalance compensator 804 (or the processor 830) can be configured to receive signals from a power meter (such as the PM 222 described with regards to FIG. 2) indicating the total optical power of an output signal of the optical transmitter in response to the change of the scale factor for each tributary channel. The power imbalance compensator 804 (or the processor 830) can also be configured to determine fitting parameters, p, α, β, for each tributary channel. Based on the fitting parameters, p, α, β, for each tributary channel and the received total optical power of the output signal in response to the change of the scale factor for each tributary channel, the power imbalance compensator 804 (or the processor 830) can determine power imbalances between the XI tributary channel and the XQ tributary channel, between the YI tributary channel and the YQ tributary channel, and between the X tributary channel and the Y tributary channel.

Once the power imbalances between tributary channels are determined, the power imbalance compensator 804 (or the processor 830) can determine a root cause (or root causes) of the power imbalance based on (1) the power imbalance between tributary channels and (2) the fitting parameters (p, α, β) of tributary channels. The power imbalance compensator 804 (or the processor 830) can subsequently adjust a set of operational settings associated with the root cause such that the power imbalance is reduced (or compensated).

In some implementations, the fitting parameter, p, of a tributary channel is associated with a raw power value in that tributary channel. The fitting parameter, α, of a tributary channel is associated with a peak-peak voltage swing applied by the RF amplifier for that tributary channel. The fitting parameter, β, of a tributary channel is associated with a bias voltage applied by a bias control circuit of the optical transmitter for that tributary channel.

In some implementations, if the fitting parameter, p, of a tributary channel is the root cause of a power imbalance, the power imbalance compensator 804 (or the processor 830) can send control signals to and adjust properties of (1) the VOA of that tributary channel from the set of VOAs (2) a semiconductor optical amplifier, and/or (3) the TOC. If the fitting parameter, α, of a tributary channel is the root cause of a power imbalance, the power imbalance compensator 804 (or the processor 830) can send control signals to and adjust properties of (1) FIR filter such that the tap coefficients and the scale factor of that tributary channel are adjusted, and/or (2) a gain setting of RF amplifier in a manual gain control (MGC) mode. If the fitting parameter, β, of a tributary channel is the root cause of a power imbalance, the power imbalance compensator 804 (or the processor 830) can send control signals to and adjust properties settings of bias control loop such that the bias voltage is adjusted. In some embodiments, any combination of these adjustments can be made to compensate power imbalances and improve performance of optical transmitter.

During a signal transmission phase of an optical transmitter, the power imbalance compensator 804 (or the processor 830) can be configured to receive signals from the power meter indicating the total optical power of the output signal in response to the change of the scale factor for each tributary channel. The power imbalance compensator 804 (or the processor 830) can then be configured to determine a slope of power change for each tributary channel. Based on the slope of power change for each tributary channel, the power imbalance compensator 804 (or the processor 830) can be configured to determine estimated power imbalances between XI tributary channel and XQ tributary channel, between YI tributary channel and YQ tributary channel, and between X tributary channel and Y tributary channel. Similar to the compensation process discussed herein when optical transmitter is in a calibration phase, the power imbalance compensator 804 (or the processor 830) can be configured to send control signals to optical transmitter to adjust at least one operational setting from a set of operational settings of optical transmitter based on the estimated power imbalances such that the estimated power imbalances are reduced during the signal transmission phase of the optical transmitter. For example, the power imbalance compensator 804 (or the processor 830) can send control signals to and adjust properties of VOAs, semiconductor optical amplifier, TOC, FIR filter, RF amplifier, and/or bias control loop such that power imbalances are reduced.

In some embodiments, during a calibration phase or a signal transmission phase of the optical transmitter, the power imbalances can be compensated without additional hardware than the processor 830 and the memory 810 described herein.

FIG. 9 is a flow chart illustrating a method 900 to compensate power imbalances of an optical transmitter during a calibration phase of the optical transmitter, according to an embodiment. The power imbalance compensation process during a calibration phase of the optical transmitter can be executed at, for example, a controller such as the controller 206 shown and described with respect to FIG. 2 or the controller 806 shown and described with respect to FIG. 8.

At 902, during a calibration phase of a coherent optical transmitter, the method determining a set of parameters associated with each tributary channel from a set of tributary channels by sending a first signal to a digital signal processor (DSP) to adjust a scale factor of that tributary channel from the set of tributary channels.

The coherent optical transmitter includes an optical modulator and the DSP operatively coupled to the optical modulator. The coherent optical transmitter outputs an optical signal processed by the DSP and modulated by the optical modulator via the set of tributary channels. The set of tributary channels includes a first tributary channel and a second tributary channel. The scale factor is associated with tap coefficients of a FIR filter and is defined as $$Scale^i = \sum_{j=1}^{N} |FIR_j^i| / \sum_{j=1}^{N} |FIR_j^i|_{ini},$$

where $FIR_j^i$ is a tap coefficient of the FIR filter. Alternatively, the scale factor can be associated with the gain setting of an RF amplifier and is defined as GainScale=$Gain_{amp}$/$Gain_{amp-ini}$, where $Gain_{amp}$ is the gain setting point for the RF amplifier, and $Gain_{amp-ini}$ is the initial gain setting point for the RF amplifier.

Method 900 includes first sending control signals to the FIR filter (or the RF amplifier) to adjust the scale factor within a predetermined range (e.g., between 0 to 1.2) for the first tributary channel from a set of tributary channels while keeping the scale factors of the other tributary channels from the set of tributary channels unchanged. The method 900 includes receiving signals from a power meter indicating the total optical power of an output signal when the scale factor is adjusted. Based on the scale factor of the first tributary channel and the received total optical power, the controller determines fitting parameters, p, $\alpha$, $\beta$, for the first tributary channel. The controller then repeats this step for the second tributary channel and determines fitting parameters, p, $\alpha$, $\beta$, for the second tributary channel.

At 904, based on the fitting parameters associated with the first tributary channel and the fitting parameters associated with the second tributary channel, the controller determines a power imbalance between the first tributary channel and the second tributary channel. Once the power imbalance between the first tributary channel and the second tributary channel is determined, the controller determines a root cause (or root causes) of the power imbalance based on (1) the power imbalance between the first tributary channel and the second tributary channel and (2) the fitting parameters (p, $\alpha$, $\beta$) of the first tributary channel and the second tributary channel. At 906, the controller subsequently sends control signals to the coherent optical transmitter to adjusts a set of operational settings associated with the root cause such that the power imbalance between the first tributary channel and the second tributary channel is reduced (or compensated).

In some implementations, the fitting parameter, p, of a tributary channel is associated with a raw power value in that tributary channel. The fitting parameter, $\alpha$, of a tributary channel is associated with a peak-peak voltage swing applied by the RF amplifier for that tributary channel. The fitting parameter, $\beta$, of a tributary channel is associated with a bias voltage applied by a bias control circuit of the optical transmitter for that tributary channel.

In some implementations, if the fitting parameter, p, of a tributary channel is the root cause of a power imbalance, the controller sends control signals to and adjusts properties of (1) the VOA of that tributary channel from the set of VOAs (2) a semiconductor optical amplifier, and/or (3) the TOC. If the fitting parameter, $\alpha$, of a tributary channel is the root cause of a power imbalance, the controller sends control signals to and adjusts properties of (1) FIR filter such that the tap coefficients and the scale factor of that tributary channel are adjusted, and/or (2) a gain setting of RF amplifier in a manual gain control (MGC) mode. If the fitting parameter, $\beta$, of a tributary channel is the root cause of a power imbalance, the controller sends control signals to and adjusts properties settings of bias control loop such that the bias voltage is adjusted. In some embodiments, any combination of these adjustments can be made to compensate power imbalances and improve performance of optical transmitter.

FIG. 10 is a flow chart illustrating a method 1000 to compensate power imbalances of an optical transmitter during a signal transmission (or operational) phase of the optical transmitter, according to an embodiment. The power imbalance compensation process during a signal transmission phase of the optical transmitter can be executed at, for example, a controller such as the controller 206 shown and described with respect to FIG. 2 or the controller 806 shown and described with respect to FIG. 8.

At 1002, during an operational phase of the optical transmitter, the method includes sending a signal to the FIR filter (or the RF amplifier) of an optical transmitter to adjust the scale factor of each tributary channel from a set of tributary channels within a predetermined range (e.g., between 0.9 and 1.1). The controller receives signals from the power meter indicating the total optical power of the output signal in response to the change of the scale factor for each tributary channel when the scale factor changes. The controller then determines a slope of power change for a first tributary channel and for a second tributary channel based on the received signals from the power meter.

At 1004, based on the slope of power change for the first tributary channel and the second tributary channel, the controller determines an estimated power imbalance between the first tributary channel and the second tributary channel.

At 1006, the method includes sending control signals to the optical transmitter to adjust a set of operational settings of the optical transmitter based on the power imbalance between the first tributary channel and the second tributary channel such that the power imbalance between the first tributary channel and the second tributary channel is reduced. Similar to the compensation process (FIG. 9) discussed herein when optical transmitter is in a calibration phase, for example, the controller sends control signals to and adjust properties of VOAs, semiconductor optical amplifier, TOC, FIR filter, RF amplifier, and/or bias control loop such that power imbalances are reduced.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
sending, to a finite impulse response (FIR) filter of an optical transmitter, a first signal to adjust a first scale factor of a first tributary channel of the optical transmitter, the first scale factor associated with a tap characteristic of the FIR filter;
determining a first set of parameters associated with the first tributary channel based on the first scale factor being adjusted;
determining a power imbalance between the first tributary channel of the optical transmitter and a second tributary channel of the optical transmitter based on the first set of parameters and a second set of parameters associated with the second tributary channel, the second set of parameters associated with a second scale factor of the second tributary channel and the tap characteristic of the FIR filter; and
sending, to at least one of an optical component of the optical transmitter or an electrical component of the optical transmitter, a second signal to adjust, based on the power imbalance, an operational setting of the at least one of the optical component or the electrical component to reduce the power imbalance between the first tributary channel and the second tributary channel.

2. The method of claim 1, further comprising:
determining the second set of parameters associated with the second tributary channel by sending a third signal to adjust the second scale factor of the second tributary channel.

3. The method of claim 1, further comprising:
modulating an optical signal by an optical modulator of the optical transmitter via a set of tributary channels, the set of tributary channels including an X polarization channel (X channel) and a Y polarization channel (Y channel), the X channel including an in-phase channel (XI channel) and a quadrature channel (XQ channel), the Y channel including an in-phase channel (YI channel) and a quadrature channel (YQ channel), the set of tributary channels including the first tributary channel and the second tributary channel.

4. The method of claim 3, wherein:
the first tributary channel is an X polarization channel (X channel),
the second tributary channel is a Y polarization channel (Y channel), and
the method further includes determining a power imbalance between the XI channel and the XQ channel, and a power imbalance between the YI channel and the YQ channel.

5. The method of claim 1, wherein:
the first set of parameters includes a first parameter, a second parameter, and a third parameter,
the first parameter is associated with a raw power value associated with the first tributary channel, the second parameter is associated with a peak-peak voltage swing applied by a radio frequency (RF) amplifier for the first tributary channel, and the third parameter is associated with a bias voltage applied by a bias control circuit for the first tributary channel.

6. The method of claim 1, wherein:

the first set of parameters includes a first parameter, a second parameter, and a third parameter, the first parameter is associated with at least one of a variable optical attenuator (VOA), a variable optical amplifier, or a tunable optical coupler (TOC), the second parameter is associated with at least one of a radio frequency (RF) amplifier or the tap characteristic of the FIR filter, the third parameter is associated with a bias voltage applied by a bias control circuit for the first tributary channel, the optical transmitter includes the VOA, the variable optical amplifier, the TOC, the RF amplifier, and the bias control circuit.

7. The method of claim 1, further comprising:

receiving a third signal associated with a total output power of an optical signal output by the optical transmitter.

8. The method of claim 1, wherein:

the power imbalance is a first power imbalance between the first tributary channel and the second tributary channel during a calibration phase of the optical transmitter, the operational setting is a first operational setting, the method further includes:

determining, during a signal transmission phase of the optical transmitter, a second power imbalance between the first tributary channel and the second tributary channel, and sending a third signal to adjust, based on the second power imbalance, a second operational setting of the optical transmitter to reduce the second power imbalance during the signal transmission phase of the optical transmitter.

9. The method of claim 1, wherein:

the adjusting the first scale factor of the first tributary channel includes adjusting the first scale factor within a first predetermined range, the power imbalance between the first tributary channel and the second tributary channel is a first power imbalance during a calibration phase of the optical transmitter, the method further includes determining, during a signal transmission phase of the optical transmitter, a second power imbalance between the first tributary channel and the second tributary channel by changing the first scale factor within a second predetermined range that is less than the first predetermined range.

10. The method of claim 1, wherein:

the optical transmitter includes a RF amplifier, the RF amplifier is configured to be in a manual gain control (MGC) mode during a calibration phase of the optical transmitter.

11. The method of claim 1, wherein:

the operational setting is a first operational setting;

the method further includes receiving a third signal from an optical receiver to adjust a second operational setting of the optical transmitter to reduce the power imbalance between the first tributary channel and the second tributary channel; and the optical receiver is configured to receive an optical signal outputted from the optical transmitter.

12. The method of claim 1, wherein the operational setting includes at least one of a first bias voltage applied by a bias control circuit of the optical transmitter for the first tributary channel or a second bias voltage applied by the bias control circuit of the optical transmitter for the second tributary channel.

13. An apparatus, comprising:

a memory; and a processor operatively coupled to the memory, the processor configured to:

send, to a finite impulse response (FIR) filter of an optical transmitter, a first signal to adjust a first scale factor of a first tributary channel from a set of tributary channels of the optical transmitter, send, to the FIR filter of the optical transmitter, a second signal to adjust a second scale factor of a second tributary channel from the set of tributary channels of the optical transmitter, the first scale factor and the second scale factor associated with a tap characteristic of the FIR filter, determine, based on the first scale factor and the second scale factor being adjusted, a power difference between the first tributary channel and the second tributary channel; and send, to a component of the optical transmitter, a third signal to adjust an operational setting based on the power difference between the first tributary channel and the second tributary channel to reduce the power difference.

14. The apparatus of claim 13, wherein the processor is configured to determine the power difference during a calibration phase of the optical transmitter.

15. The apparatus of claim 13, wherein the processor is configured to determine the power difference during an operational phase of the optical transmitter.

16. The apparatus of claim 15, wherein the processor is configured to determine the power difference without additional hardware than the memory and the processor.

17. The apparatus of claim 13, wherein:

the processor is configured to:

receive, in response to the first scale factor being adjusted to a first scale factor value, a fourth signal associated with a first total output power value of an optical signal at the first scale factor value, the optical signal being output by the optical transmitter, receive, in response to the first scale factor being adjusted to a second scale factor value, a fifth signal associated with a second total output power value of the optical signal at the second scale factor value;

determine a slope of power change based on the first total output power value at the first scale factor value and the second total output power value at the second scale factor value;

the determining the power difference between the first tributary channel and the second tributary channel is based on the slope of power change.

18. The apparatus of claim 13, wherein:

the first scale factor is adjusted within a first predetermined range during a calibration phase of the optical transmitter, the first scale factor is adjusted within a second predetermined range during an operational phase of the optical transmitter, the second predetermined range being less than the first predetermined range.

19. The apparatus of claim 13, wherein:
the processor is configured to determine, based on the first scale factor being adjusted, a parameter associated with a peak-peak voltage swing applied by a radio frequency (RF) amplifier for the first tributary channel, and
the determining the power difference is based on the parameter.

20. An apparatus, comprising:
a plurality of electrical components including a finite impulse response (FIR) filter;
a plurality of optical components including an optical modulator having a first tributary channel and a second tributary channel; and
a processor operatively coupled to the plurality of electrical components and the plurality of optical components, the processor configured to:
send, to the FIR filter, a first signal to adjust a first scale factor of the first tributary channel, the first scale factor associated with a tap characteristic of the FIR filter,
determine, based on the first scale factor being adjusted, a power imbalance between the first tributary channel and the second tributary channel,
send, to at least one of the plurality of electrical components or the plurality of optical components, a second signal to adjust, based on the power imbalance, an operational setting of the at least one of the plurality of electrical components or the plurality of optical components to reduce the power imbalance between the first tributary channel and the second tributary channel.

* * * * *